(12) United States Patent
Khambati et al.

(10) Patent No.: US 10,903,608 B1
(45) Date of Patent: Jan. 26, 2021

(54) MULTI-DIRECTIONAL MOTION MONITORING OF PLUGGED ELECTRICAL CONNECTOR

(71) Applicant: INTERNATIONAL BUSINESS MACHINES CORPORATION, Armonk, NY (US)

(72) Inventors: Suraush Khambati, Poughkeepsie, NY (US); William L. Brodsky, Binghamton, NY (US); Ryan Elsasser, Poughkeepsie, NY (US); Noah Singer, White Plains, NY (US); Khaalid Persaud Juggan McMillan, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/551,861

(22) Filed: Aug. 27, 2019

(51) Int. Cl.
  *H01R 13/66* (2006.01)
  *H01R 33/76* (2006.01)
  *H01R 107/00* (2006.01)

(52) U.S. Cl.
  CPC ..... *H01R 13/6683* (2013.01); *H01R 33/7664* (2013.01); *H01R 2107/00* (2013.01); *H01R 2201/06* (2013.01)

(58) Field of Classification Search
  CPC .......................... H01R 13/6683; Y10S 439/913
  See application file for complete search history.

(56) References Cited

U.S. PATENT DOCUMENTS

| | | | |
|---|---|---|---|
| 5,226,417 | A | 7/1993 | Swedlow et al. |
| 5,317,305 | A | 5/1994 | Campman |
| 5,486,119 | A | 1/1996 | Nabeshima et al. |
| 6,940,405 | B2 | 9/2005 | Script et al. |
| 8,773,255 | B2 | 7/2014 | Montena |

(Continued)

FOREIGN PATENT DOCUMENTS

| | | |
|---|---|---|
| EP | 0 858 131 A1 | 8/1998 |
| WO | WO 1987/005402 A2 | 9/1987 |

OTHER PUBLICATIONS

Bowman, Robert, "Smart Connector Technology", Research at RIT, the Rochester Institute of Technology Research Report, Spring/Summer 2008, p. 19.

(Continued)

*Primary Examiner* — Tho D Ta
(74) *Attorney, Agent, or Firm* — Tihon Poltavets, Esq.; Kevin P. Radigan, Esq.; Heslin Rothenberg Farley & Mesiti P.C.

(57) ABSTRACT

Multi-directional monitoring of connector motion is provided to facilitate identifying potential wear of one or more connector electrodes. A sensor assembly is configured to sense in multiple directions motion of a plug connector relative to a connector receptacle when the plug connector is operatively plugged to the connector receptacle, and to generate sensor data based on sensed motion of the plug connector relative to the connector receptacle. A control system is provided to monitor, based on the sensor data, motion of the plug connector relative to the connector receptacle to facilitate identifying potential wear of one or more electrodes of the plug electrode(s) and the receptacle electrode(s) due to the motion.

20 Claims, 18 Drawing Sheets

(56) References Cited

U.S. PATENT DOCUMENTS

| | | | |
|---|---|---|---|
| 9,011,183 | B2 | 4/2015 | Rothkopf et al. |
| 9,270,062 | B2 | 2/2016 | Zhou |
| 9,410,988 | B2 | 8/2016 | Zavis |
| 10,365,322 | B2 * | 7/2019 | Coyne ................ G01R 31/2874 |
| 2004/0036273 | A1 | 2/2004 | McClary |
| 2009/0171616 | A1 | 7/2009 | Zhang et al. |
| 2009/0179523 | A1 | 7/2009 | Wang et al. |
| 2017/0003459 | A1 | 1/2017 | Takeuchi et al. |
| 2020/0174058 | A1 * | 6/2020 | Schmier, II ............ G01R 31/60 |

OTHER PUBLICATIONS

Instrumentation Today, "Magnetostrictive Transducer", published Aug. 2011, http://www.instrumentationtoday.com/magnetostrictive-transducer/2011/08 (3 pages).

Circuit Globe, "Capacitive Transducer", published 2017, https://circuitglobe.com/capacitive-transducer.html (6 pages).

Wikipedia, "Piezoelectric Sensor", https://en.wikipedia.org/wiki/Piezoelectric_sensor, downloaded Aug. 12, 2019 (5 pages).

* cited by examiner

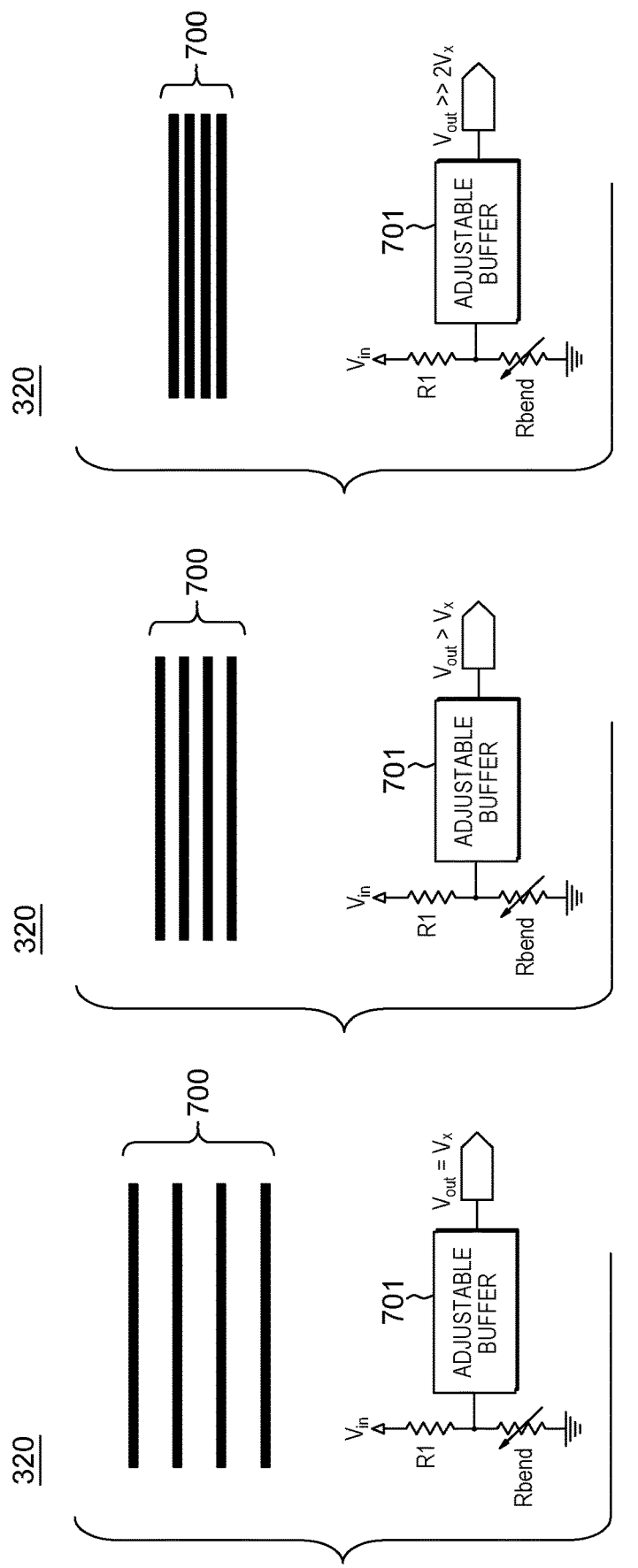

MULTI-DIRECTIONAL MOTION MONITORING OF PLUGGED ELECTRICAL CONNECTOR

BACKGROUND

Electrical connectors are devices used to electrically connect and create an electrical circuit between different system components. For instance, in system networking, such as computer networking, electrical cable connectors can be used to interconnect system components. A server network can contain tens or even hundreds, or more, cables which connect between network components. Electrical connectors are typically either of a male component type, called a plug connector, or a female component type called a connector receptacle or connector socket.

Thousands of electrical connector configurations are available, including, for instance, for forming power connections, data connections, signal communication connections, audio visual applications, etc. Often electrical connectors are differentiated by function, and include inline or cable connectors permanently attached to a cable, allowing the cable to be plugged into another connector, such as a chassis or panel connector permanently attached to a system component, such as a server.

Electrical connectors include electrodes which are typically a metal, such as a copper alloy, brass, phosphor bronze, etc. For many applications, the electrode metal is coated with an inert metal, such as gold, nickel or tin to increase electrical conductivity and durability of the electrode. For instance, copper alloys have good mechanical properties as electrodes for many applications, but can be prone to corrosion. Thus, copper pins are often coated with gold, especially for analog signals and high reliability applications.

SUMMARY

Certain shortcomings of the prior art and additional advantages are provided through the provision, in one or more aspects of an apparatus, which includes a connector receptacle, a plug connector, a sensor assembly, and a control system. The connector receptacle includes one or more receptacle electrodes, and the plug connector includes one or more plug electrodes. The plug connector is configured to couple to the connector receptacle with the plug electrode(s) in contact with the receptacle electrode(s) to form an electrical connection. The sensor assembly is configured to sense in multiple directions motion of the plug connector relative to the connector receptacle when the plug connector is operatively plugged to the connector receptacle, and to generate sensor data based on sensed motion of the plug connector relative to the connector receptacle. The control system is configured to monitor, based on the sensor data, motion of the plug connector relative to the connector receptacle to facilitate identifying potential wear of one or more electrodes of the plug electrode(s) and receptacle electrode(s) due to the motion.

In another aspect, an apparatus is provided which includes a connector receptacle, a plug connector, a sensor assembly, and a control system. The connector receptacle includes one or more receptacle electrodes, and the plug connector includes one or more plug electrodes. The plug connector is configured to couple to the connector receptacle with the plug electrode(s) in contact with the receptacle electrode(s) to form an electrical connection. The sensor assembly is configured to sense motion of the plug connector relative to the connector receptacle in three dimensions when the plug connector is operatively plugged to the connector receptacle, and to generate sensor data based on sensed motion of the plug connector relative to the connector receptacle. The control system is configured to monitor, based on sensor data, motion of the plug connector relative to the connector receptacle to facilitate identifying potential wear of one or more electrodes of the plug electrode(s) and receptacle electrode(s) due to sensed motion by determining, at least in part, whether the sensed motion exceeds a calibrated threshold profile indicative of likely wear degradation of the one or more electrodes due to the motion.

In a further aspect, a method is provided which includes providing a sensor assembly for an electrical connection to be established between a connector receptacle and a plug connector, the connector receptacle including one or more receptacle electrodes, and the plug connector being configured to couple to the connector receptacle, and including one or more plug electrodes. The plug connector operatively plugs to the connector receptacle with the plug electrode(s) in contact with the receptacle electrode(s) to form the electrical connection, and the sensor assembly is configured to sense motion of the plug connector relative to the connector receptacle when the plug connector is operatively plugged to the connector receptacle, and to generate sensor data based on the sensed motion of the plugged connector relative to the connector receptacle. The method further includes providing a control system configured to monitor, based on the sensor data, motion of the plug connector relative to the connector receptacle to facilitate identifying potential wear of one or more electrodes of the plug electrode(s) and receptacle electrode(s) due to the motion.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 7A depicts a partial embodiment of a sensor assembly including a pressure sensor and sense circuitry, with the pressure sensor illustrated in an uncompressed state, in accordance with one or more aspects of the present invention;

FIG. 7B depicts the pressure sensor assembly of FIG. 7A, with the pressure sensor illustrated in a partially compressed state, correlating to (for instance) inward movement of a guide pin relative to the sensor assembly within the cavity, in accordance with one or more aspects of the present invention;

FIG. 7C depicts the pressure sensor assembly of FIGS. 7A & 7B, with the pressure sensor illustrated in a fully compressed state, indicative of further inward movement of the guide pin relative to the sensor assembly within the cavity, in accordance with one or more aspects of the present invention;

DETAILED DESCRIPTION

Figure 1A:
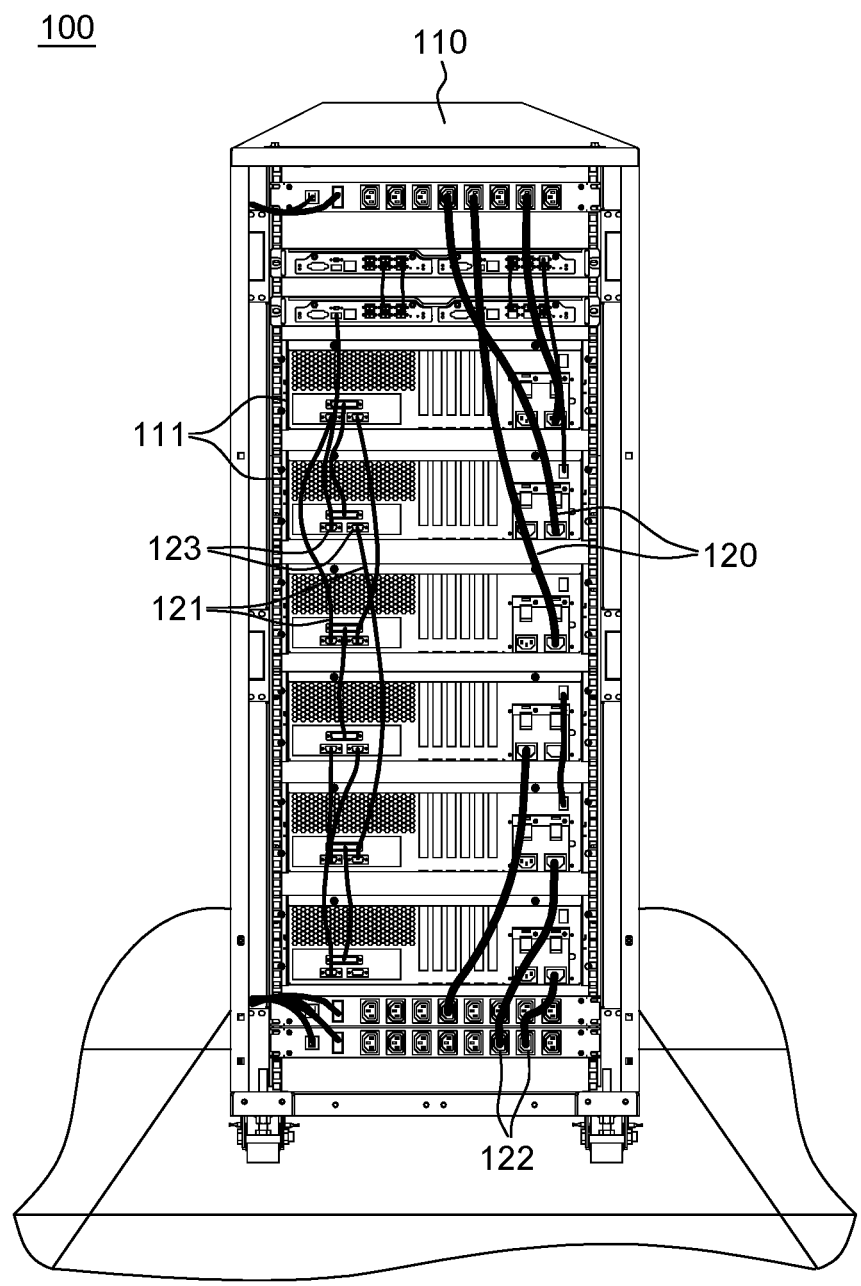
FIG. 1A depicts one embodiment of a network environment in association with which multi-directional motion monitoring of plugged electrical connectors can be used, in accordance with one or more aspects of the present invention.

Aspects of the present invention and certain features, advantages and details thereof, are explained more fully below with reference to the non-limiting example(s) illustrated in the accompanying drawings. Descriptions of well-known materials, systems, devices, processing techniques, etc., are omitted so as to not unnecessarily obscure the invention in detail. It should be understood, however, that the detailed description and the specific example(s), while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular implementation of an apparatus or method with multi-directional motion monitoring of one or more plugged electrical connectors such as disclosed herein.

Note also that illustrative embodiments are described below using specific code, designs, architectures, protocols, layouts, schematics, or tools only as examples, and not by way of limitation. Furthermore, the illustrative embodiments may be described in certain instances using particular software, tools, and data processing environments only as example for clarity of description. The illustrative embodiments can be used in conjunction with other comparable or similarly purposed structures, systems, applications, architectures, etc. One or more aspects of an illustrative embodiment can be implemented in hardware, software, or a combination thereof.

Any advantages listed herein are only examples, and are not intended to be limiting to the illustrative embodiments. Additional or different advantages can be realized by specific illustrative embodiments. Furthermore, a particular illustrative embodiment can have some, all, or none of the advantages listed herein Networks, such as computer networks, communication networks, and other networks, often rely on cables to connect components of the network to one another. Within a computer network, a large number of cables can be used to interconnect network components, both within an electronics rack, and between electronics racks. Currently, there are few if any approaches to monitoring or characterizing motion, such as vibration-induced motion, experienced by operatively plugged (or docked) connectors, such as might occur during shipping or operation of the network. Vibration-induced motion can arise from a number of factors including, for instance, transporting or moving of an electronics rack with operatively plugged connectors, moving or handling of operatively plugged connector cables, an accident or other shock event impacting the operatively plugged connectors, an earthquake, etc.

As noted, for many applications, connector electrodes can be coated with a thin metal, such as gold, nickel or tin to increase electrical conductivity and durability of the electrodes. Vibration-induced motion, however, can negatively affect the quality of the electrode's coating, potentially resulting in performance degradation, leading to lower reliability and possible failure of a connection between components.

By way of example, FIG. 1A depicts one embodiment of a network environment 100 including a rack 110 of computing equipment, which can represent a partial network, a single network, or multiple interconnected networks. Note also that the phrase "network" is used broadly herein to refer to any computer, communications, power, etc., system, with two or more components interconnect, such as by cables, or directly through docking ports. The network components can be any of a variety of components, with a rack, such as a server rack of a data center, being one example only of a network, or portion of a network, having cables plugged between components for a desired setup configuration. The cables can be, for instance, power cables, input/output cables, signal cables, or other communication or data cables, etc. In the example of FIG. 1A, multiple power cables 120 are shown, along with multiple signal or data cables 121 interconnecting multiple network components 111, such as servers, of the system. Typically, a cable can have a cable plug connector at a first end, and a plug connector at a second end. Further, the components of the network are shown to have connector receptacles 122, 123 configured for operatively plugging or docking an appropriate cable connector to interconnect components of the network in the desired configuration. Note also that, although typically having a first end and a second end, a "cable" can include a configuration with multiple first ends and/or multiple second ends, each having associated therewith a plug connector to be plugged in the network to a respective connector receptacle.

Note that "plug connector" and "connector receptacle" are broadly used herein to refer to any first electrical connector and any second electrical connector configured to operatively plug together or dock so as to form an electrical connection, such as to transfer signals, data, power, etc. The plug connector can denote any type of connector that plugs or operatively docks into another connector, referred to as a connector receptacle or socket herein. In one embodiment, the plug connector can include electrodes of a male component type, and/or of female component type, while the connector receptacle can include corresponding electrodes of the other of the male component type and/or female component type so that the two electrical connectors dock together to form one or more electrical connections.

Figure 1B:
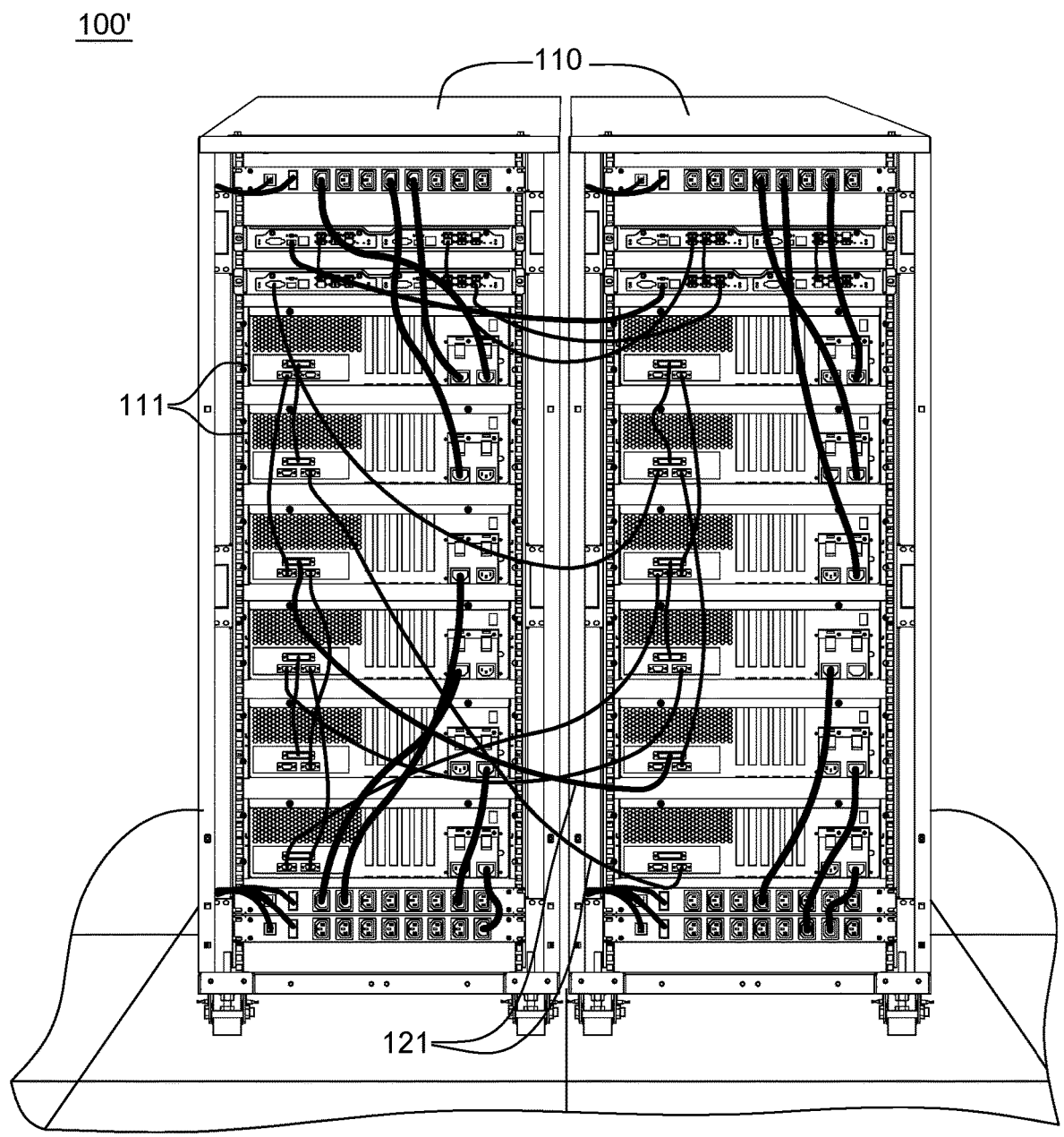
FIG. 1B depicts another embodiment of a network environment in association with which multi-directional motion monitoring of plugged electrical connectors can be used, in accordance with one or more aspects of the present invention.

FIG. 1B is a similar network environment 100' to network environment 100 of FIG. 1A, with an exception being that multiple racks 110 of computing equipment are illustrated, by way of example. In this embodiment, multiple cables 121 electrically interconnect components in different racks of the network in a desired network configuration.

Note that the computer rack embodiments of FIGS. 1A & 1B are depicted by way of example only of a type of network or system within which electrical connectors can be used to electrically interconnect components of the network or system. The connector motion monitoring facilities disclosed herein can be applied to any type of electrical connector, in any type of system or network. For instance, motion monitoring of connectors can be applied to power connectors, data connectors, signal connectors, communications connectors, cable connectors, card or board connectors, etc.

Figure 2A:
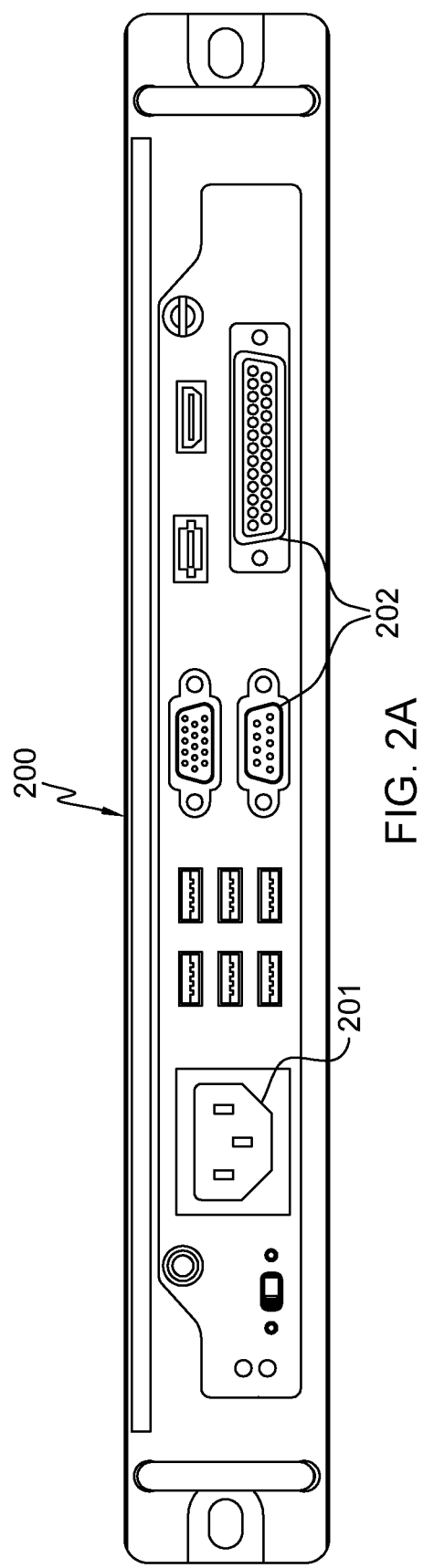
FIG. 2A depicts one embodiment of a network component with different types of electrical connectors in association with which multi-directional motion monitoring of plugged electrical connectors can be used, in accordance with one or more aspects of the present invention.

By way of further example, FIG. 2A depicts one embodiment of an electronic component having multiple different types of connector receptacles, including a power connector receptacle 201, as well as other data or signal connector receptacles 202. In each instance, an appropriately configured plug connector of a cable can be plugged to the connector receptacle as desired for a particular network or system configuration.

Figure 2B:
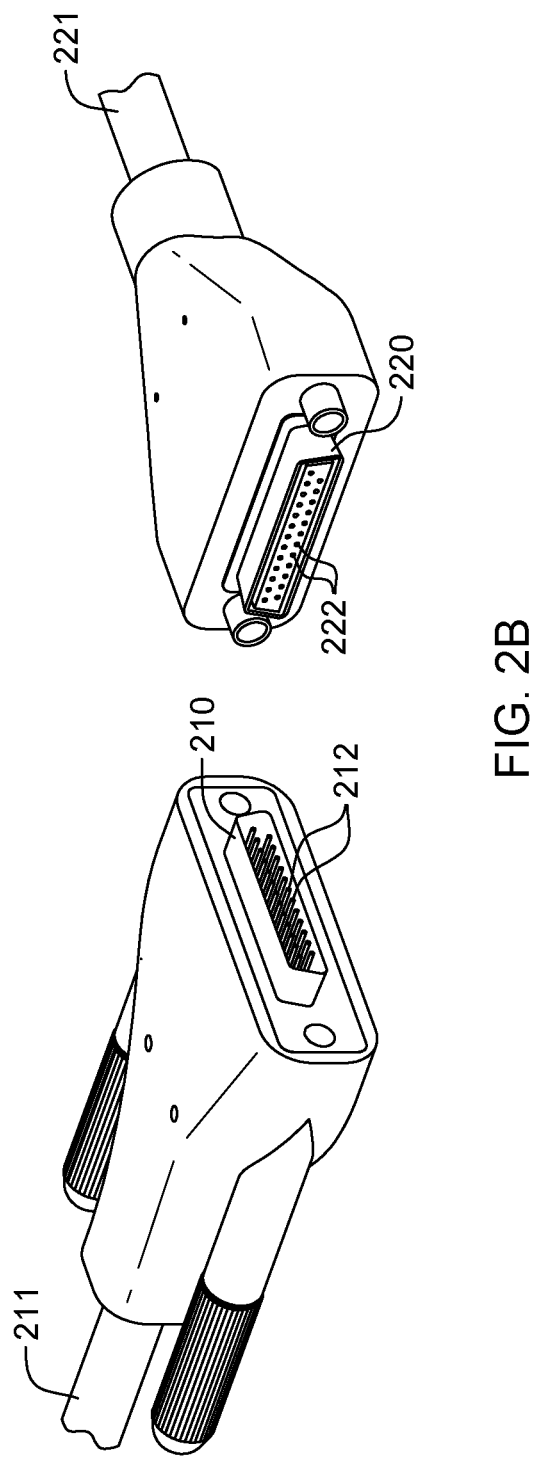
FIG. 2B depicts another embodiment of a connection environment in association with which multi-directional motion monitoring of plugged electrical connectors can be used, in accordance with one or more aspects of the present invention.

FIG. 2B depicts another connection environment, where a cable connector 210 is shown at one end of a cable 211, and another cable connector 220 is shown at one end of another cable 221, with cable connector 210 being, for instance, a plug connector, and cable connector 220 being a connector receptacle. As shown, cable connector 210 includes multiple plug electrodes 212 sized and configured to dock within corresponding receptacle electrodes 222 of cable connector 220.

In still another embodiment, the electrical connectors could be associated with respective electronic components or subassemblies, such as cards, boards, backplanes, other devices, etc., which are operatively docked together, without assistance of cabling.

In any of the above-discussed embodiments, as well as other embodiments, one or more of the electrical connectors can be configured with shock or vibration motion monitoring, in accordance with one or more aspects disclosed herein.

In general, disclosed herein are apparatuses with, and methods of, multi-directional motion monitoring of plugged electrical connectors. The apparatus includes a connector receptacle, a plug connector, a sensor assembly, and a control system. The connector receptacle includes one or more receptacle electrodes, and the plug connector includes one or more plug electrodes. The plug connector is configured to couple to the connector receptacle, with the plug electrode(s) in contact with the receptacle electrode(s) to form an electrical connection. The sensor assembly is configured to sense in multiple directions motion of the plug connector relative to the connector receptacle when the plug connector is operatively plugged (or docked) to the connector receptacle, and to generate sensor data based on sensed motion of the plug connector relative to the connector receptacle. The control system is configured to monitor, based on the sensor data, motion of the plug connector relative to the connector receptacle to facilitate identifying potential wear of one or more electrodes of the plug electrode(s) and receptacle electrode(s) due to the motion.

In one embodiment, the control system is configured to determine, based at least in part on the sensor data, whether the sensed motion exceeds a calibrated threshold profile indicative of likely wear degradation of the one or more electrodes due to the motion. Further, in one implementation, the control system is configured to provide an indication when the sensed motion exceeds the calibrated threshold profile indicative of likely wear degradation of the one or more electrodes.

In one or more implementations, the apparatus includes one or more elements, such as one or more guide pins, that extend from the plug connector or from connector receptacle into a cavity in the other of the plug connector and connector receptacle when the plug connector is operatively plugged to the connector receptacle. Further, in one or more implementations, the sensor assembly includes at least one pressure sensor positioned to monitor motion of the element within the cavity in multiple directions, and to generate the sensor data based on the sensed motion of the element within the cavity.

In one implementation, a pressure sensor of the at least one pressure sensor is associated with the cavity to generate the sensor data based on the sensed motion of the element within the cavity when the plug connector is operatively plugged to the connector receptacle. In another implementation, a pressure sensor of the at least one pressure sensor is coupled to the element to generate the sensor data based on sensed motion of the element within the cavity when the plug connector is operatively plugged to the connector receptacle.

In one or more implementations, the element is a guide pin, and the cavity is configured to receive the guide pin when the plug connector is operatively plugged to the connector receptacle. In one implementation, the guide pin is a tapered guide pin.

In one or more embodiments, the sensor assembly includes multiple pressure sensor subassemblies, with each pressure sensor subassembly being configured to monitor a respective directional motion of the plug connector relative to the connector receptacle when operatively docked. Further, in one or more embodiments, the sensor assembly is configured to monitor motion of the plug connector relative to the connector receptacle in three dimensions.

In one or more embodiments, the control system is configured to save sensor data generated over time to record a history of motion of the plug connector relative to the connector receptacle when the plug connector is operatively plugged to the connector receptacle.

Advantageously, disclosed herein are apparatuses and methods to, in part, determine historical motion of a connector interface by recording a history of motion of a plug connector relative to a connector receptacle when operatively docked. Thus, a facility for determining and characterizing vibration-induced motion of docked connectors is provided, which can operate during shipping and as well as during operation. For instance, the apparatus can be powered during shipping by a battery supply, where an external power source is unavailable, but monitoring plugged connection motion is desired. Alternatively, the apparatus can be powered by generating current based on the detected motion itself. For instance, a motion-induced current can arise from a guide element forcing changes in pressure sensors of the sensor assembly as the guide pin moves with movement of the plug connector relative to the connector receptacle.

In one or more implementations discussed herein, the guide pin can be a tapered guide pin, such as a conical or pyramid-shaped guide pin, with the cavity receiving the tapered guide pin housing a set of pressure sensors, such as piezoelectric sensor strips, for monitoring motion of the guide pin within the cavity along each axis. For instance, in one or more embodiments for a horizontal motion, there can be one or more pressure sensors to measure guide pin motion along a positive axis, and one or more other pressure sensors to monitor motion in the opposite direction.

Advantageously, control system processing disclosed herein is configured to monitor for electrode wear based on relative connector motion or vibration. Monitoring motion can be particularly advantageously where connectors include a thin coating layer, such as a gold, nickel, or tin layer, which can be worn away by a rubbing action between contacting electrodes due to relative connector motion in one or more directions.

Advantageously, multi-directional motion monitoring of plugged electrical connectors such as disclosed herein can be integrated directly, at least in part, within the connectors, in order to allow for continual monitoring of docked connectors. Connector wear can be evaluated over the entire service life of interconnected network or system components, and can provide a mechanism for self-monitoring during a shock event, earthquake event, or other shock or vibration-inducing event between electrical connectors.

Further, a capability can be provided for monitoring connector motion by wirelessly communicating sensor data to a remote control system, such as a control server or system of an electronics rack or within a data center, or other type of network center.

Figure 3A:
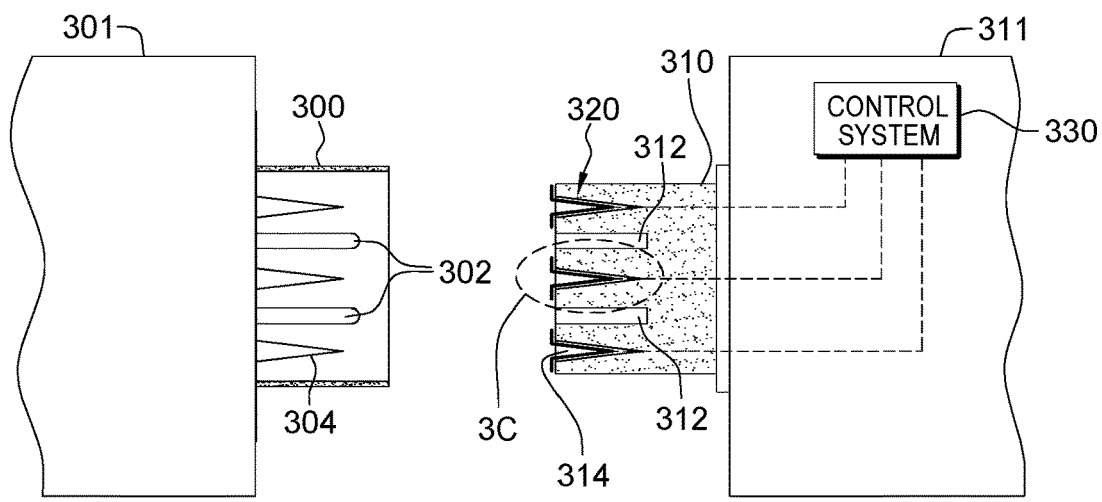
FIG. 3A depicts one embodiment of an apparatus with multi-directional motion monitoring of a plugged electrical connector, in accordance with one or more aspects of the present invention.
Figure 3B:
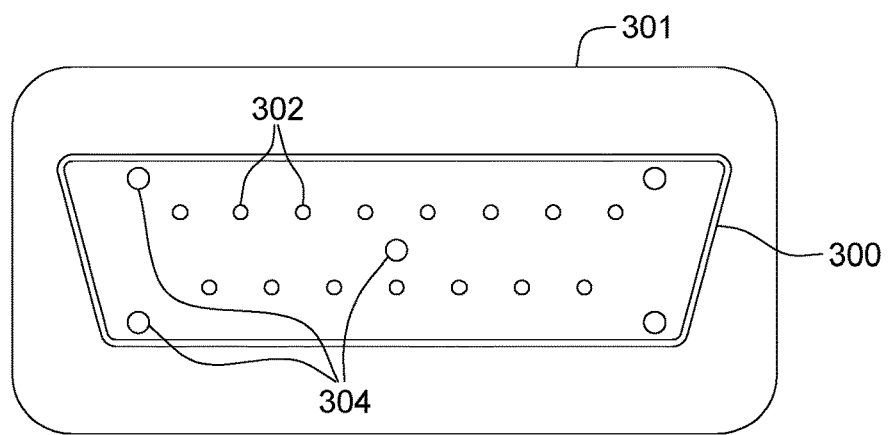
FIG. 3B is an end elevational view of one embodiment of the plug connector of the apparatus of FIG. 3A, in accordance with one or more aspects of the present invention.
Figure 3C:
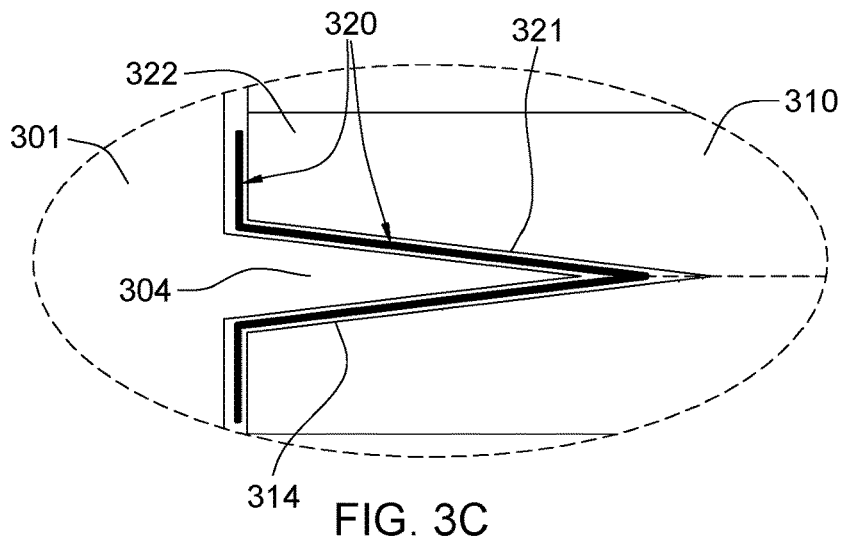
FIG. 3C is a partial view of the apparatus of FIG. 3A, with the plug connector operatively plugged to the connector receptacle, and showing a guide pin within a respective cavity in contact with multiple pressure sensors of a sensor assembly, in accordance with one or more aspects of the present invention.

By way of further explanation, FIGS. 3A-3C depict one embodiment of an apparatus, in accordance with one or more aspects of the present invention.

In the embodiment depicted in FIG. 3A, a first component 301 electrically connects to a second component 311 via a plug connector 300 associated with first component 301 plugging into a connector receptacle 310 associated with second component 311. In one or more embodiments, first component 301 is a cable, and second component 311 is any electronic component such as a server, or other network component, or even another cable.

As shown, plug connector 300 includes one or more plug electrodes 302, and connector receptacle 310 includes one or more receptacle electrodes 312 configured to receive plug electrode(s) 302. Receptacle electrode(s) 312 can be defined by one or more electrical contacts provided on, or forming, one or more inner walls of respective openings sized to receive plug electrode(s) 302. With plug connector 300 operatively docked or plugged into connector receptacle 310, plug electrode(s) 302 electrically contact respective receptacle electrode(s) 312 to form one or more electrical connections.

In one or more embodiments, elements such as guide pins 304, extend from either plug connector 300 or connector receptacle 310 into a cavity 314 in the other of plug connector 300 or connector receptacle 310 when the plug connector is operatively plugged to the connector receptacle. In the embodiment of FIGS. 3A-3C, guide pins 304 are associated with plug connector 300 by way of example only, and respective cavities 314 are provided within connector receptacle 310, with guide pins 304 and cavities 314 being configured for a guide pin 304 to be received into an associated cavity 314 with operative plugging of plug connector 300 into connector receptacle 310.

By way of example only, five guide pins 304 are illustrated in the embodiment of FIG. 3B. Additional or fewer guide pins can be used depending on the implementation. With the five guide pin configuration of FIG. 3B, a center guide pin is provided, along with four corner guide pins. This multi-pin configuration of FIGS. 3A-3C advantageously allows for detecting differences in motion across different regions of the connector. For instance, a twisting or turning motion of plug connector 300 relative to connector receptacle 310 can result in different directional motions of the plug electrode(s) relative to the receptacle electrode(s)

across the interconnection, which can be detected using a multi-guide pin and sensor configuration such as described herein.

As illustrated in FIG. 3A, a sensor assembly 320 is provided configured to sense in multiple directions motion of plug connector 300 relative to connector receptacle 310 when plug connector 300 is operatively plugged to connector receptacle 310, and to generate sensor data based on sensed motion of the plug connector relative to the connector receptacle. Sensor data is provided to a control system 330, such as a microcontroller, which can be associated with component 311, or remote from component 311. Control system 330 is, in one or more embodiments, configured to save sensor data, and facilitate identifying potential wear of one or more electrodes of plug electrode(s) 302 and receptacle electrode(s) 312 due to relative motion between the connectors.

FIG. 3C illustrates one embodiment of placement of pressure sensors of sensor assembly 320. As illustrated, a cavity 314 of connector receptacle 310 can be configured with multiple pressure sensors 321 within the cavity, as well as one or more pressure sensors 322 surrounding, or adjacent to the cavity, on a face of connector receptacle 310. In operation, pressure sensors 321, 322 are physically engaged by guide pin 304 and first component 301 or plug connector 300 with operative plugging of plug connector 300 into connector receptacle 310. In this manner, any movement of plug connector 300 relative to connector receptacle 310 in any direction results in a corresponding movement of guide pin 304, which is detected or sensed by one or more pressure sensors 321, 322 of the sensor assembly. Note that in one or more embodiments, sensor assembly 320 can include multiple pressure sensor subassemblies, with each pressure sensor subassembly being configured to monitor a respective directional motion of the guide pin, and thus, of the plug connector relative to the connector receptacle.

In one or more embodiments, a variety of pressure sensors can be used to detect movement of a guide pin within a cavity, and thus, provide data indicative of movement of the plug connector relative to the receptacle connector. For instance, piezoelectric strips can be provided on the inner walls of cavities 314, as well as on the adjoining face of receptacle connector 310, for contact by guide pins 304 and plug connector 300, respectively, with docking of the plug connector into the receptacle connector. Piezoelectric strips are commercially available sensors which can be used, in one or more embodiments, as strain indicators for various applications. Piezoelectricity is the accumulation of electric charge in response to an applied pressure, and piezoelectric materials generally output a voltage proportional to the magnitude of the applied mechanical stress (including compression or extension). Piezoelectric sensors can be made from piezo-ceramics and from single-crystal materials. Piezo-ceramics have higher sensitivities, while single-crystal materials are more stable.

Other pressure sensing techniques could also be employed in an apparatus or method such as disclosed herein. For instance, piezo-resistive, inductive, capacitive, and/or resistive transducers could be used, as well as electromagnetic induction, or magneto-restrictive transducers. The particular pressure sense technology employed can depend, in one or more embodiments, on the particular connector configurations with which the sensor assembly is to be used. For many applications though, piezoelectric sensors can provide optimum performance.

Each pressure sensor subassembly can be configured and located to sense motion of a guide pin within the respective cavity in a particular direction. For instance, the pressure subassemblies 321 depicted in FIG. 3C can be provided as subassemblies to measure plus and minus y axis and/or z axis motion, while pressure sensors 322 can be provided as one or more subassemblies to measure plus and minus x axis motion (such as inward and outward motion of the guide pin relative to the cavity). Thus, in one or more implementations, sensor assembly 320 is configured to monitor motion of plug connector 300 relative to receptacle connector 310 in all three dimensions. Further, as discussed below, in an operatively plugged condition, there may be some sensor compression in a neutral position, so that any movement in/out, left/right, or up/down, can potentially be identified using fewer pressure sensors.

Figure 4A:
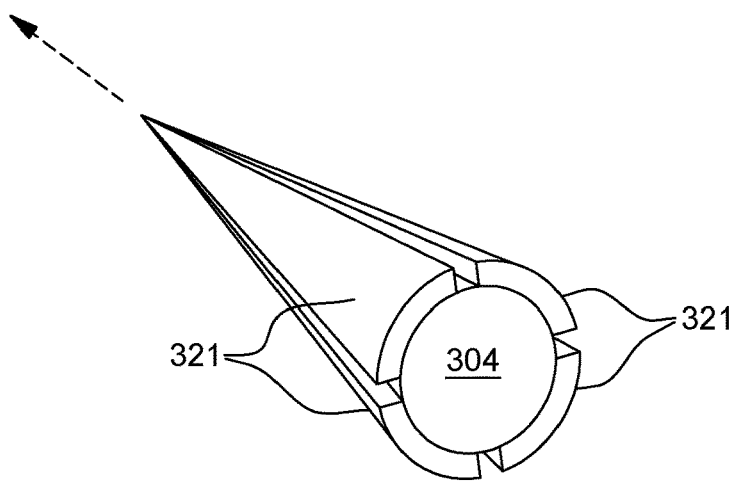
FIG. 4A depicts one embodiment of a guide pin for an electrical connector, and multiple pressure sensors of a sensor assembly, in accordance with one or more aspects of the present invention.
Figure 4B:
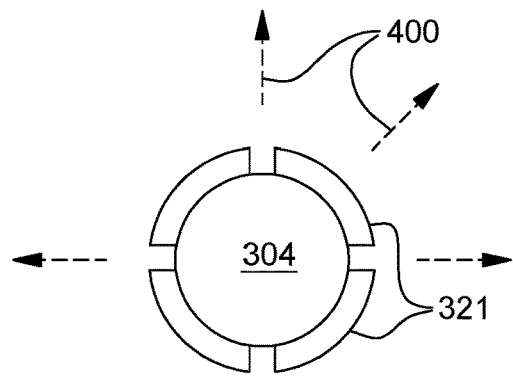
FIG. 4B is an end elevational view of the guide pin and pressure sensors of FIG. 4A, in accordance with one or more aspects of the present invention.
Figure 5A:
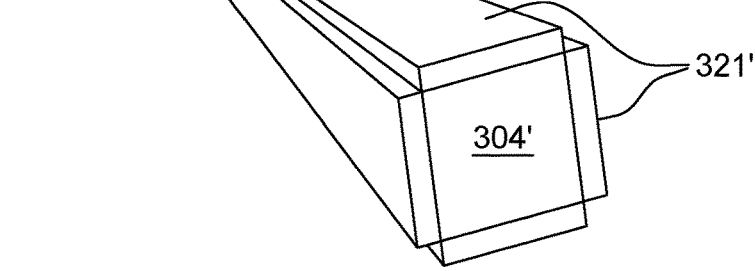
FIG. 5A depicts another embodiment of a guide pin for an electrical connector, and multiple pressure sensors of a sensor assembly, in accordance with one or more aspects of the present invention.
Figure 5B:
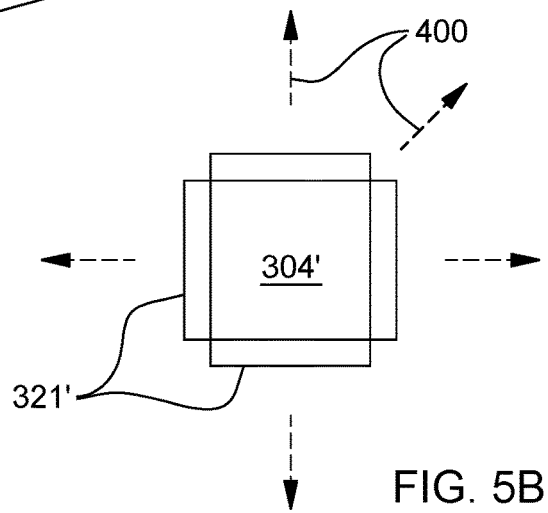
FIG. 5B is an end elevational view of the guide pin and pressure sensors of FIG. 5A, in accordance with one or more aspects of the present invention.

As noted above, and as illustrated in FIGS. 4A-5B, the element or guide pin can have a variety of configurations. In one embodiment, the guide pin 304 (depicted in FIGS. 4A-4B) is cone-shaped, and one or more of the pressure sensors 321 or subassemblies within the cavity can be configured for the particular shape of guide pin 304. As illustrated in FIG. 4B, motion 400 in different directions or orientations can be detected by the different pressure sensors 321 affected. In the implementation of FIGS. 5A & 5B, a guide pin 304' is shown prism-shaped as a further example, with the pressure sensors 321' being triangular-shaped, in one embodiment.

Those skilled in the art should note that the particular shape of the guide pin is not limited to the shapes depicted in FIGS. 4A-5B. Rather, an element, such as a tapered guide pin, can have a variety of different configurations, as desired for a particular implementation. Note also, that the individual elements or guide pins can be differently configured across the plug connector, if desired. Further, note that for each set of connectors, one center element and four corner-mounted elements, with corresponding cavities and pressure sensors, is one example only of an implementation to characterize motion of a plugged electrical connector.

Figure 6:
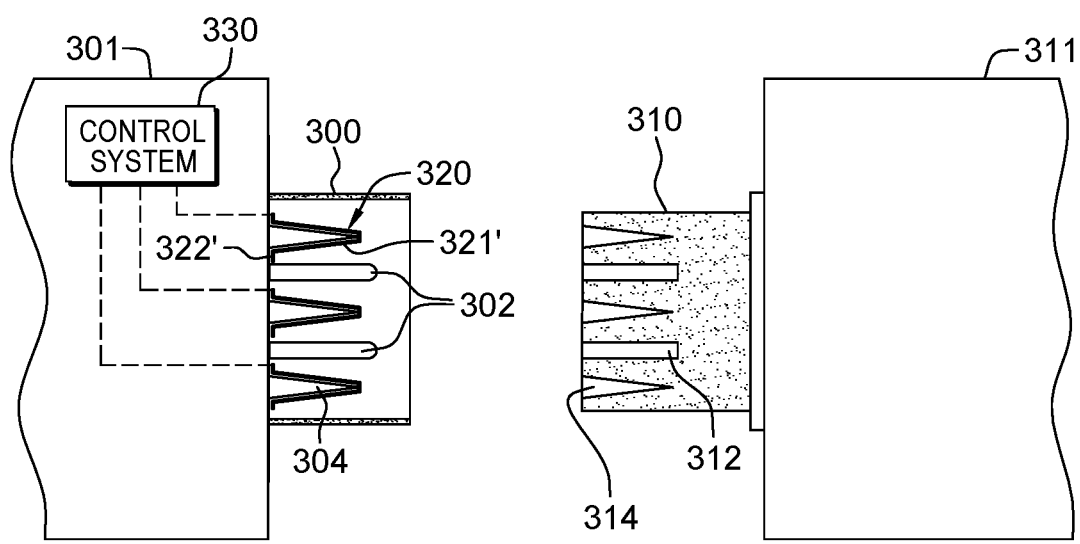
FIG. 6 depicts another embodiment of an apparatus with multi-directional motion monitoring of a plugged electrical connector, in accordance with one or more aspects of the present invention.

FIG. 6 illustrates an apparatus similar to the apparatus of FIGS. 3A-3C, with exception that the sensor assembly and control system are associated with connector plug 300, and component 301, respectively. In this configuration, the pressure sensors 321, 322 of the sensor assembly are coupled or mounted directly to guide pins 304, and/or depending on the implementation, to a connector surface adjacent to or surrounding guide pins 304, as illustrated. Otherwise, the structure and function of the apparatus of FIG. 6 is similar to that described above in connection with FIGS. 3A-3C.

FIGS. 7A-7C depict different states of one embodiment of pressure sensors, and associated sense circuitry, in accordance with one or more aspects of the present invention.

In FIG. 7A, sensor assembly 320 is shown to include one or more pressure sensors 700, such as piezoelectric pressure sensors, which are part of a sense circuit, being designated as Rbend in the circuit. Depending on the bend radius or compression state of the pressure sensors 700, output from adjustable buffer 701 can vary. In FIG. 7A, pressure sensors 700 are shown in uncompressed state, with Vout equaling an initial, uncompressed voltage (Vx).

In FIG. 7B, the pressure sensor(s) 700 is shown partially compressed, such as half compressed, with the sense circuit detecting the compression such that Vout is greater than Vx. With continued compression of pressure sensor(s) 700, the Vout voltage increases to greater than 2Vx, as shown in the fully compressed state of FIG. 7C.

As noted, in one or more embodiments, pressure sensors 700 can be piezoelectric pressure sensors, with the state of compression varying depending upon the location of the element, e.g., tapered guide pin, within the receptacle containing the pressure sensors. As the element moves within the cavity, the pressure that the element applies to the pressure sensors varies in magnitude and direction. These magnitude and directional changes are characterized by the sense circuits of the individual pressure sensor subassemblies as a change in voltage or current. These changing voltages (or changing currents) of the one or more sensor assemblies represent, in one or more embodiments, the sensor data provided to the control system for use in monitoring motion of the plug connector relative to the connector receptacle.

Figure 8A:
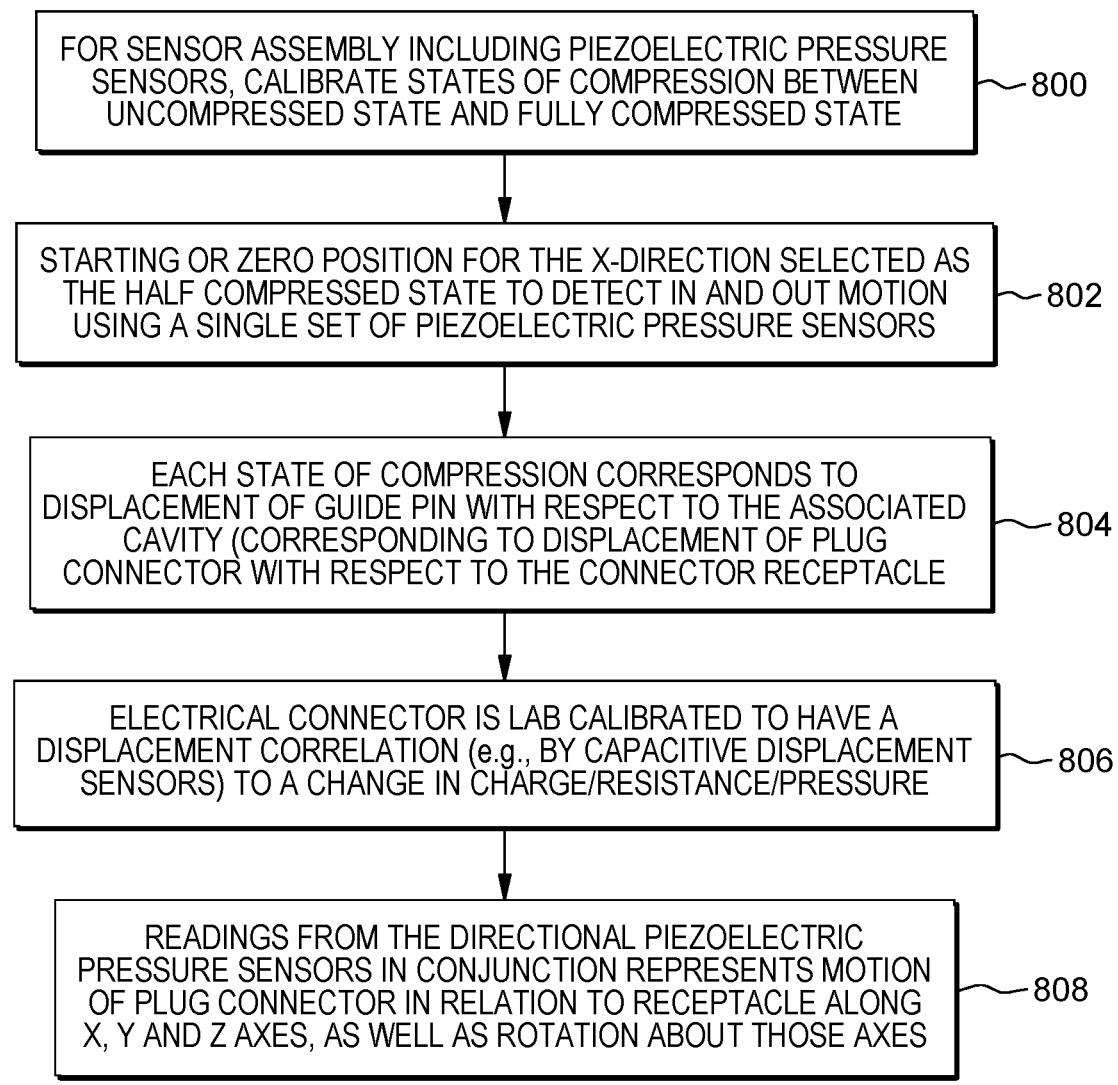
FIG. 8A depicts one embodiment of a process for calibrating and measuring movement of a guide pin within an associated cavity using a sensor assembly, in accordance with one or more aspects of the present invention.

FIG. 8A depicts one embodiment of a process for calibrating and measuring movement of an element (such as a guide pin) within an associated cavity using a sensor assembly. As illustrated, for a sensor assembly including piezoelectric pressure sensors, the states of compression between an uncompressed state and fully compressed state are calibrated 800. In one or more implementations, the starting or zero position for x-direction movement can be selected as the half-compressed state to detect in and out motion of the guide pin relative to the cavity using a single set of piezoelectric pressure sensors 802. Each state of compression corresponds to displacement of the guide pin with respect to the associated cavity, or more particularly, with respect to the pressure subassemblies lining the associated cavity, and this displacement corresponds to displacement of the plug connector with respect to the connector receptacle 804.

In one or more embodiments, the electrical connector is lab calibrated to have a displacement correlation (for instance, by capacitive displacement sensors) to a change in charge, or change in resistance, or change in pressure 806. Readings from the pressure sensor subassemblies, such as the directional piezoelectric pressure sensors, in conjunction represent motion of the plug connector in relation to the receptacle along the x, y, and z axes, as well as rotation about those axes 808.

Figure 8B:
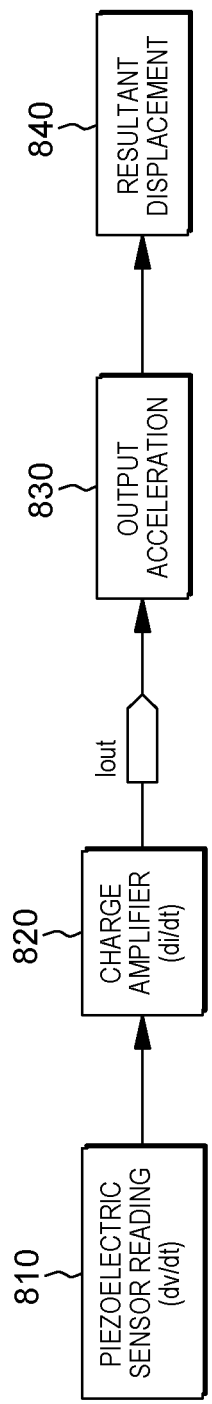
FIG. 8B is a circuit representation of one embodiment of calibrating and measuring displacement of a guide pin using one or more piezoelectric pressure sensors as part of the sensor assembly, in accordance with one or more aspects of the present invention.

FIG. 8B depicts one embodiment of a circuit for calibrating and measuring displacement. A piezoelectric sensor reading overtime (dv/dt) 810 is obtained and amplified by a charge amplifier (di/dt) 820, resulting in an output current Iout. An output acceleration circuit 830 provides a resultant displacement 840. In one embodiment, the output acceleration circuit calibrates output current Iout to an equivalent acceleration, with the displacement being ascertained from the acceleration once obtained. As explained herein, the resultant displacement or motion can then be used to determine (e.g., based on prior calibration of the connectors) how much wear is potentially occurring between the connector electrodes.

Figure 9:
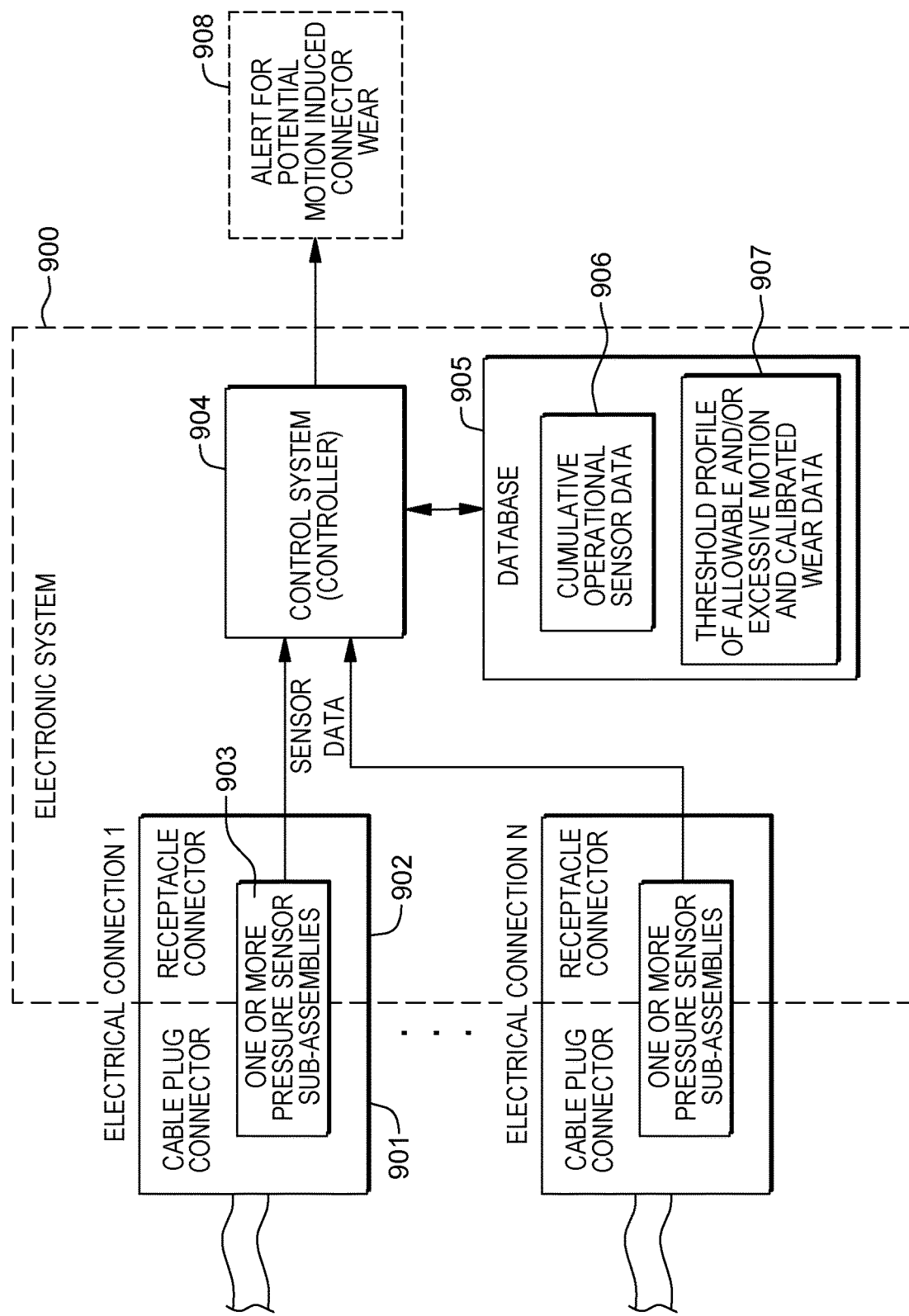
FIG. 9 depicts one embodiment of an electronic system or network environment with multi-directional motion monitoring of plugged electrical connectors, in accordance with one or more aspects of the present invention.

By way of further explanation, FIG. 9 depicts one embodiment of an electronic system or network environment 900 with multiple electrical connections (electrical connection 1 . . . electrical connection N), one or more of which can include multi-directional motion monitoring of plugged connectors, in accordance with one or more aspects of the present invention. Each electrical connection is defined, in the depicted embodiment, by a cable plug connector 901 being operatively plugged or docked to a respective receptacle connector 902. As explained herein, one or more pressure sensor subassemblies 903 are associated with the plug connector and/or receptacle connector. The one or more pressure sensor subassemblies are disposed between an element (guide pin) and a respective cavity, with movement of the element within the cavity resulting in sensor data that is provided to a controller or control system 904. In one embodiment, electronic system 900 includes a database 905 for storing or logging cumulative operational sensor data received over time 906, as well as one or more threshold profiles of allowable and/or excessive motion calibrated or correlated to electrode wear data 907. As noted, control system 904 is configured to identify when the monitored motion exceeds a threshold profile, either as the result of a single event, or based on the cumulative occurrences of motion-inducing events, and to optionally provide an alert for potential motion-induced connector wear 908 when appropriate.

Figure 10:
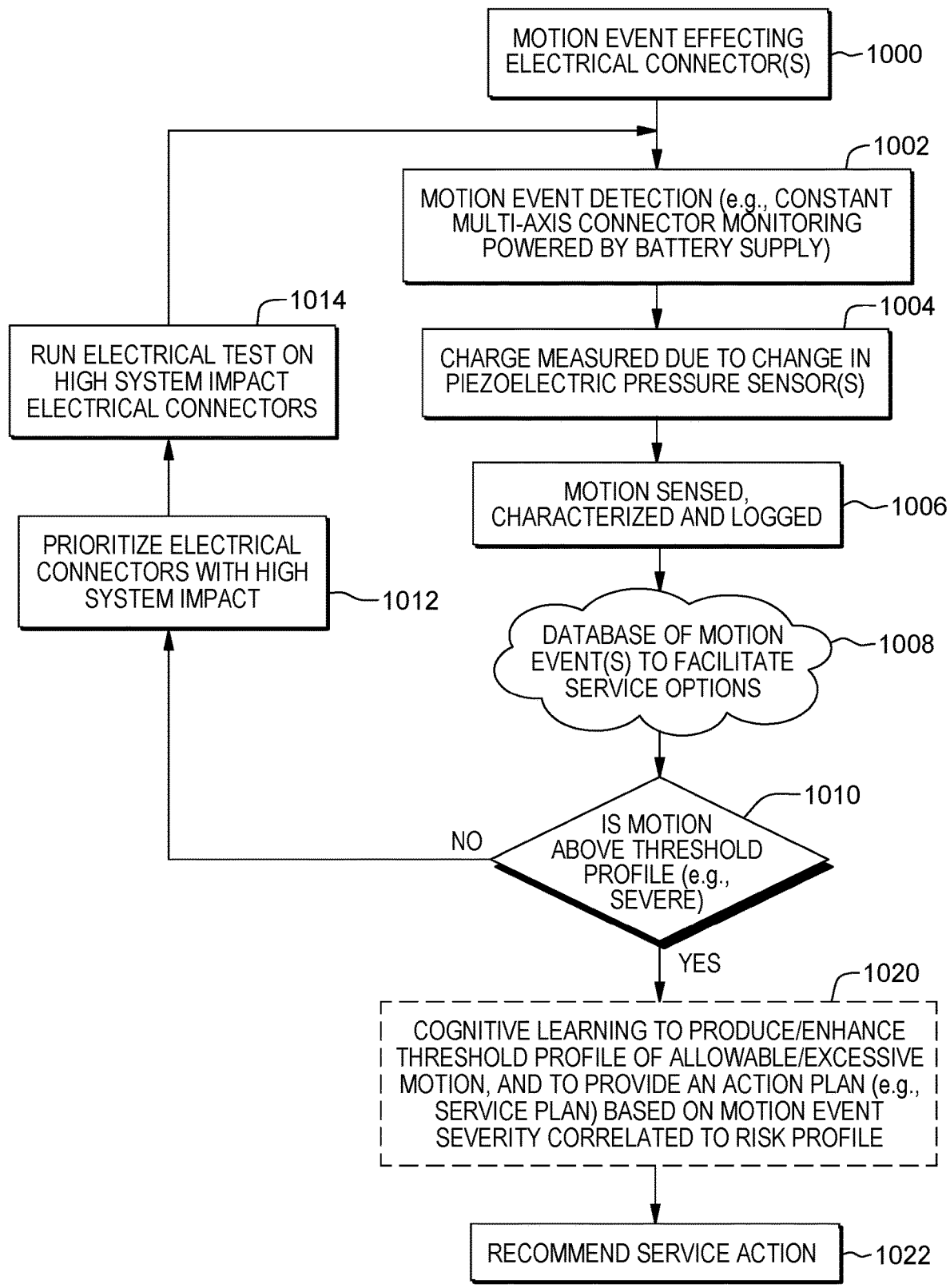
FIG. 10 depicts a process flow that illustrates certain aspects of some embodiments of the present invention.

FIG. 10 depicts a process flow example that illustrates certain aspects of some embodiments of the present invention. Referring to FIG. 10, a motion event can occur affecting one or more electrical connectors 1000. For instance, a motion event such as a shock or other vibration event to the one or more connectors can occur, or the docked connectors could be in transport within a larger system, or connection motion could result from an earthquake, etc. The motion event is detected 1002. For instance, in one or more embodiments, constant multi-axis connector monitoring is provided, which can be powered with a battery supply or battery backup in situations where main power is unavailable, such as during transport of an electronics rack with docked connectors. Event monitoring or motion detection can include a charge being measured due to a change in piezoelectric pressure sensor(s) 1004. The motion is sensed via the sensors data, and is characterized and logged 1006, in one or more embodiments. For instance, the sensor data can be logged to a database of motion events to facilitate evaluating service options 1008. The control system can determine whether the detected motion is above a threshold profile indicative of the motion being severe 1010. If "no", then the processing can optionally prioritize certain electrical connectors as high system impact connectors 1012. In such a case, electrical tests can be run on the high system impact electrical connectors 1014 to ensure that there has been no degradation of performance of those connectors based on the motion.

In a case where the motion is identified by the control system as being severe, such as above a threshold profile, the control system can be programmed or configured to take an action, such as provide a recommended service action 1022. Optionally, the recommended action can be provided by an artificial intelligence-based cognitive agent, which can be configured to produce or enhance the threshold profile of allowable/excessive motion, and to provide an action plan based on motion event severity correlated to a risk profile 1020. As explained further herein, the cognitive agent could be local, such as part of the electronic system housing the apparatus disclosed herein, or be accessed remotely from the electronic system, in which case, the cognitive agent might be cloud-based.

Figure 11:
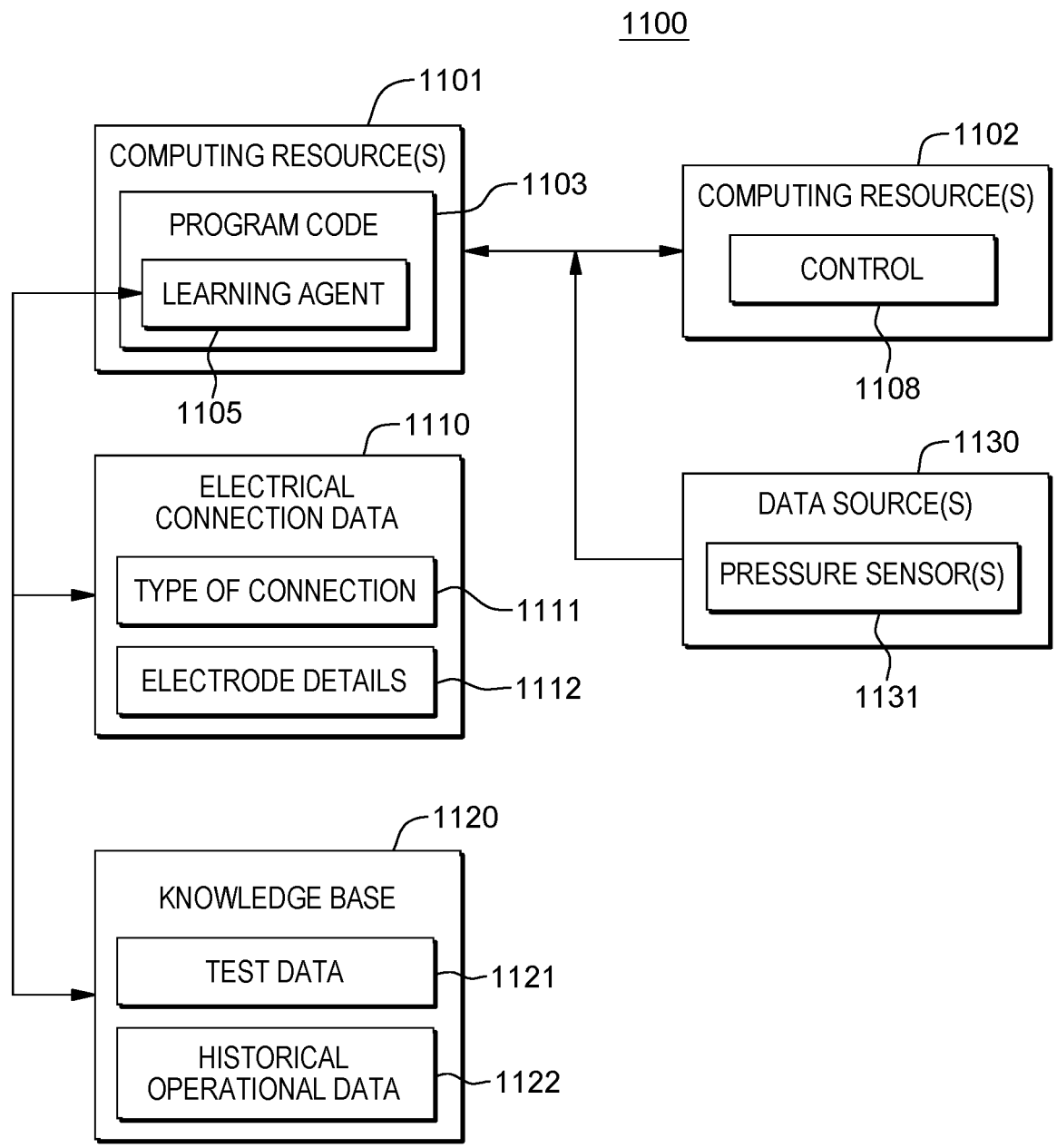
FIG. 11 illustrates another embodiment of a technical environment into which various aspects of a control system can be implemented for multi-directional motion monitoring of one or more plugged electrical connectors, in accordance with one or more aspects of the present invention.

By way of further example, FIG. 11 depicts one embodiment of an environment 1100 into which various aspects of some embodiments of the present invention can be implemented. Environment 1100 includes computing devices, including one or more computing resources 1101 that execute program code 1103 that generates or updates a control 1108 process or model, based on machine learning (e.g., via cognitive and/or learning agent 1105), and utilizes control 1108 to, for instance, control producing or enhancing in operation one or more threshold profiles of allowable or excessive motion-based event severity correlated to risk of electrode wear or damage, and/or one or more service plans or recommendation action(s) based on the monitored motion.

For illustrative purposes only, control 1108 is depicted in FIG. 11 as being housed on one or more separate computing resources 1102 from the one or more computing resources 1101 that execute program code 1103. By way of example, computing resource(s) 1102 housing control 1108 can be located within an electronic component or system such as depicted in FIGS. 3A, 6 & 9, while computing resource(s) 1101 could be located separate from the component or system. Note that this is a non-limiting example of an implementation, and that program code 1103 and control 1108 can also share a computing resource(s). Likewise, in the illustrated embodiment, program code 1103 can be executed on varied resources in various embodiments of the present invention, where the learning agent 1105 and the program code 1103 are separate modules.

Figure 13:
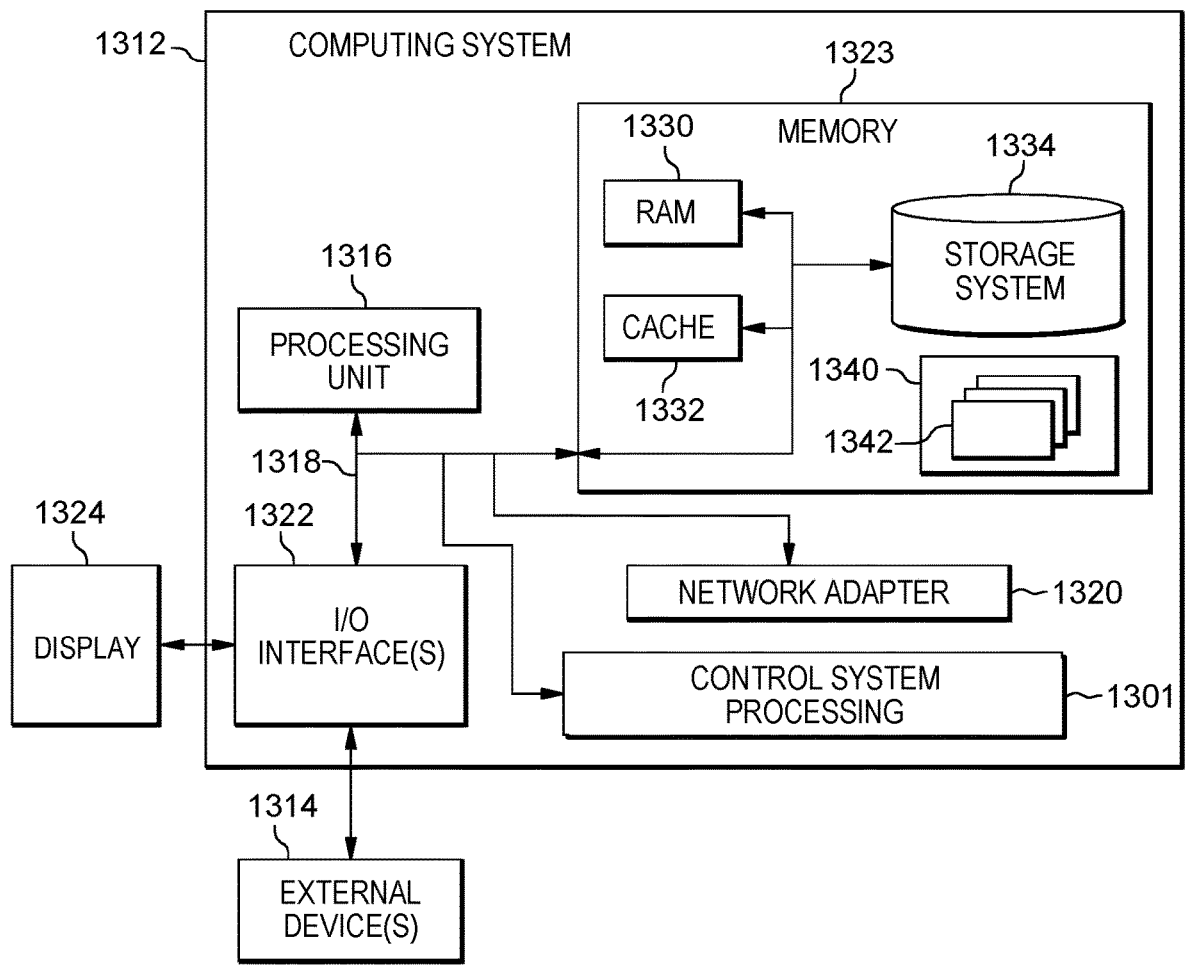
FIG. 13 depicts one embodiment of a computing system which can implement or facilitate implementing control system processing, in accordance with one or more aspects of the present invention.

As understood by one skilled in the art, program code, as referred to in this application, can include both software and hardware. For example, program code in certain aspects of the present invention can include fixed function hardware, while other aspects can utilize a software-based implementation of the functionality described. Certain embodiments combine both types of program code. One example of program code, also referred to as one or more programs, is depicted in FIG. 13 as program/utility 1340, having a set (at least one) of program modules 1342, which can be stored in memory 1323.

Continuing with FIG. 11, in embodiments of the present invention, program code 1103 utilizes electrical connection data 1110, such as from various sensors and/or sources to ascertain, for instance, a type of connection 1111, electrode details 1112, etc., of the connectors being monitored. In one or more further embodiments, electrical connection data 1110 can be ascertained by learning agent 1105 by accessing, for instance, a knowledge base 1120, which can also include electrode wear test data 1121, as well as historical operational data 1122, such as historical sensor data, calibrated threshold profiles, as well as any other information useful to learning agent 1105 in determining or evaluating, for instance, an extent of motion, a threshold profile, or an action recommendation/plan based on sensed motion severity correlated to a wear risk profile.

One or more data sources 1130 can be employed to obtain sensor data for use by control 1108 processing and/or learning agent 1105, such as described herein. These data sources 1130 can be, in one or more embodiments, associated with the plug connector or connector receptacle. For instance, data sources 1130 can include one or more pressure sensors 1131 such as described above. Those skilled in the art will note that a variety of sensors could be associated with the electrical connectors to generate sensor data to facilitate motion analysis by control 1108 processing or learning agent 1105.

In one or more embodiments, program code 1103 can be configured to update control 1108 in real-time, upon receipt of sensor data from data source(s) 1130. Program code 1103 or learning agent 1105 uses the obtained data to continually learn and update, in one or more embodiments, the patterns and rules that form control 1108 processing. For instance, an event that would trigger program code 1103 to update control 1108 processing in real-time could be new sensor data, such as data indicating that the electrical connector is undergoing a motion event of intensity or duration not previously documented.

In one or more embodiments of the present invention, program code 1103 on one or more computing resources 1101 can facilitate determining, either responsively or proactively, the occurrence of wear degradation of one or more electrodes of the electrical connector. The process can include cognitively analyzing the knowledge base 1120 data accessible to program code 1103, for instance, across a network, such as the Internet. The program code 1103 can use the knowledge base 1120, along with the sensor data from data source(s) 1130, to tailor the control 1108 process or model to dynamically enhance performance of the control system in identifying wear degradation of the electrodes. For example, program code 1103 with learning agent 1105 can incorporate data from one or more sources to, for instance, extract a recommended plan of action for the control based on monitored connector motion.

In some embodiments, program code 1103 executing on one or more resources 1101 can apply machine learning algorithms to generate and train control 1108 process. The program code and embodiments of the present invention can perform a cognitive analysis to generate data structures, including algorithms used by the program code to generate and provide the desired control recommendation(s) 1108. Machine learning (ML) solves problems that cannot be solved by numerical means alone. In an ML-based example, program code extracts various features/attributes from training data (e.g., data collected from various data sources, as well as connector data and knowledge base information). The data or features are used to develop a particular function or hypothesis, which the program code uses as a machine learning model. In identifying a control adjustment for a particular movement scenario, the program code can utilize various techniques to select features (elements, patterns, attributes, etc.) including, but not limited to, diffusion mapping, principle component analysis, recursive feature elimination (a brute force approach to selecting features), and/or a random forest. The program code can utilize a machine learning algorithm to train the machine learning model (e.g., the algorithms utilized by the program code), including providing rankings or weights for extracted data or conclusions, so that the program code can train predictor or recordation functions to include the machine learning model. The conclusions can be evaluated by a quality metric. By selecting an appropriate set of training data, the program code trains the machine learning model to identify and weight various attributes (e.g., features, patterns) that correlate (for example) a detected motion or an accumulation of motions with potential or likely electrode wear, as well as to provide one or more service or action recommendations.

Control 1108 process, generated (in one embodiment) by program code 1103, can be self-learning, as the program code 1103 updates the control 1108 model based on data received from data sources 1130 during the operational phase; that is, after the learning phase, and related to monitoring of the connectors, such as during a shock or vibration event. In one embodiment, program code 1103 includes learning agent 1105, which cognitively analyzes any new data deviating from the current control 1108 model or process and adjusts the control to improve processing moving forward.

In some embodiments of the present invention, program code 1103 executing on one or more computing resources 1101 utilizes existing cognitive analysis tools (or agents) to create, and tune, control 1108 processing based, for instance, on data obtain from various data sources, including connection data 1110, knowledge base 1120 data, and data from data sources 1130. Some embodiments of the present invention can utilize IBM Watson® as learning agent 1105 (i.e., as a cognitive agent). IBM Watson® is a registered trademark of International Business Machines Corporation, Armonk, N.Y., USA. In embodiments of the present invention, program code 1103 interfaces with IBM Watson® application program interfaces (APIs) to perform a cognitive analysis of obtained data. In some embodiments of the present invention, program code 1103 interfaces with the application program interfaces (APIs) that are part of a known cognitive agent, such as the IBM Watson® Application Programming Interface (API), a product of International Business Machines Corporation, to determine wear impacts of detected motion on the connector electrodes.

In some embodiments of the present invention, certain of the APIs of, for instance, the IBM Watson® API, include a cognitive agent (e.g., learning agent) that includes one or more programs, including, but not limited to, natural language classifiers, Retrieve and Rank (i.e., a service available through the IBM Watson® developer cloud that can surface the most relevant information from a collection of documents), concept/visual insights, tradeoff analytics, document conversion and/or relationship extraction. In an embodiment of the present invention, one or more programs to analyze the data obtained by the program code 1103 across various sources can utilize one or more of a natural language classifier, Retrieve and Rank APIs, and tradeoff analytics APIs.

The program code 1103 can provide wear predictions or action recommendations for a given connection scenario as values vary. In some embodiments of the present invention, program code 1103 can provide a specific recommendation to be made by control 1108 logic reactive to the sensor data based on, for instance, a vibration or shock event. In other embodiments of the present invention, program code 1103 can provide control based on predictive analytics using, for instance, available wear testing and motion sensor data.

In some embodiments of the present invention, program code 1103 utilizes a neural network to analyze collected data relative to control 1108 processing to generate a desired recommendation action by the control system. Neural networks are a programming paradigm which enable a computer to learn from observational data, in this case sensor data, connection data, and knowledge base information, etc. This learning is referred to as deep learning, which is a set of techniques for learning in neural networks. Neural networks, including modular neural networks, are capable of pattern (e.g., state) recognition with speed, accuracy, and efficiency, in situations where data sets are multiple and expansive, including across a distributed network, including but not limited to, cloud computing systems. Modern neural networks are non-linear statistical data modeling tools. They are usually used to model complex relationships between inputs and outputs, or to identify patterns (e.g., states) in data (i.e., neural networks, are non-linear statistical data modeling or decision making tools). In general, program code 1103 utilizing neural networks can model complex relationships between inputs and outputs and identify patterns of data. Because of the speed and efficiency of neural networks, especially when parsing multiple complex data sets, neural networks and deep learning can provide solutions to many problems in multiple-source processing, where program code 1103 and embodiments of the present invention can be used to, for instance, build a processing model for control 1108 recommendations.

Figure 12A:
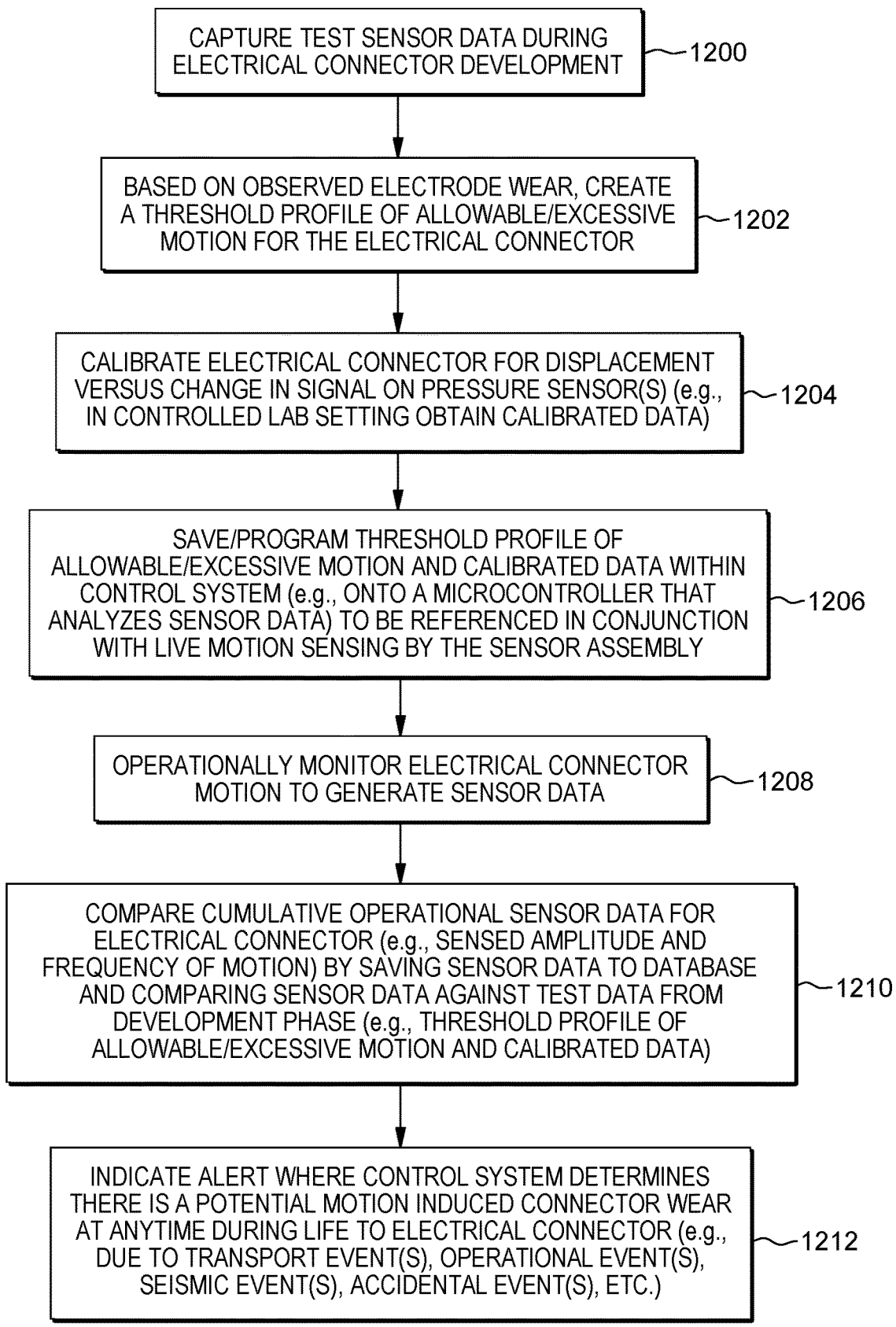
FIG. 12A depicts another process flow that illustrates certain aspects of some embodiments of the present invention.

By way of further example, FIG. 12A depicts an embodiment of an operational process flow that illustrates further aspects of some embodiments of the present invention. Test sensor data is captured during electrical connector development 1200. For instance, during a development phase, each connector is subjected to shock and vibration testing, where an external capacitive displacement sensor measures overall motion and dye/pry tests confirm and quantity of wear. Based on observed electrode wear, a threshold profile is created of allowable/excessive motion for the electrical connector 1202. Each electrical connector can be calibrated for displacement versus change in signal on the one or more pressure sensors, such as in a controlled lab setting, to obtained calibrated data 1204. The threshold profile can then be saved or programmed, along with the calibrated data, to define for the control system allowable/excessive motion. For instance, the threshold profile of allowable or excessive motion, along with calibrated wear data, can be saved onto a microcontroller associated with the electrical connector that analyzes the sensor data. This information can be referenced in conjunction with the sensor obtained from live-motion sensing by the sensor assembly 1206. Multi-directional motion monitoring of plugged electrical connectors then occurs 1208 during operation of the network or system.

In one or more embodiments, cumulative operational sensor data for an electrical connector can be compared by saving the sensor data to a database and periodically comparing the sensor data against test data from the development phase 1210. For instance, the sensed amplitude and frequency of motion can be saved for periodic comparing against wear test data from the development phase, including the threshold profile of allowable/excessive motion, and the calibrated wear data. Depending on the results of the comparison, the control system can indicate or signal an alert where the control determines there is potential motion-induced connector wear has occurred or is occurring 1212. This alert can occur anytime during the life of the electrical connector, and can result from a variety of vibration events, including, due to transport of the associated network component or system, an operational event, such as where an operator inadvertently contacts an electrical connection or associated cable, resulting in vibration of the electrical connection, or other accidental event, or could result from a seismic event, etc.

Figure 12B:
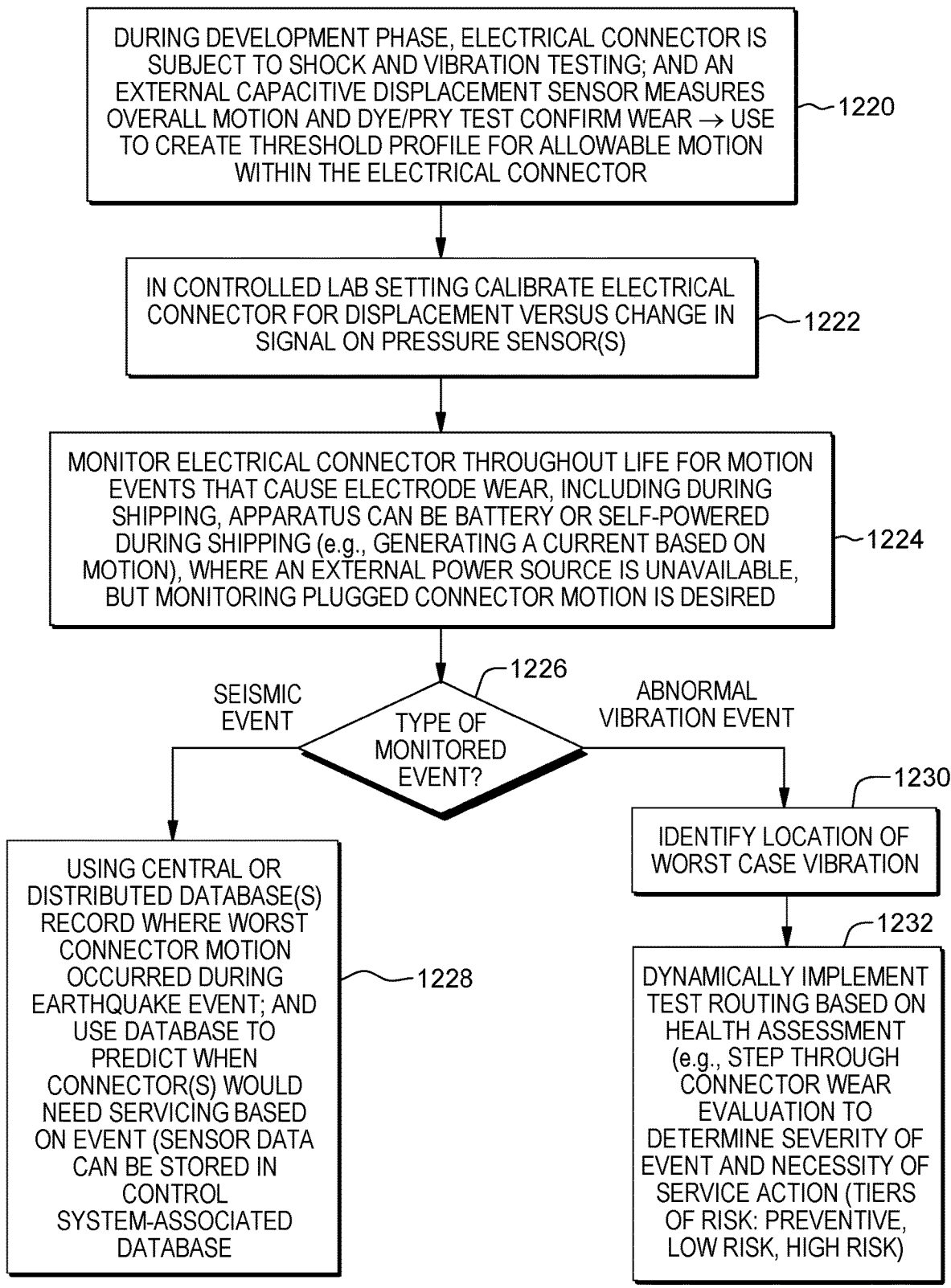
FIG. 12B depicts a further process flow that illustrates certain aspects of some embodiments of the present invention.

FIG. 12B depicts another embodiment of an operational process flow that illustrates certain aspects of some embodiments of the present invention. During the development phase, each electrical connector to be monitored for motion-induced wear as described herein is subject to shock and vibration testing, with (for instance) an external capacitive displacement sensor measuring overall motion and dye/pry testing confirmation used to evaluate electrode wear. The results of the development phase testing are used to create a threshold profile of allowable motion for the electrical connector. In one or more embodiments, different types of connectors can each undergo a corresponding development phase to obtain a threshold profile and the wear data discussed herein. In a controlled lab setting, the electrical connector is calibrated for motion-induced displacement versus change in signal on the one or more pressure sensors of the sensor assembly 1222.

In operation, the electrical connector is monitored throughout its life for motion events that can cause electrode wear 1224. For instance, during shipping, the apparatus disclosed herein can be battery or self-powered (for instance, by generating a current based on motion) where an external power source may be unavailable, but monitoring plugged connector motion is still desired 1224. The action recommended or performed by control system can depend on the type of monitored event 1226. Where the event is a seismic event, using either a central or distributed database, the controller can record where the worst connection motion occurred as a result of the earthquake event 1228. This information can then be used by the control system to predict when the connector(s) would need servicing due to the event or accumulated events. In one or more embodiments, sensor data is stored in a control system associated database.

Where the type of monitored event is an abnormal vibration event, the location of the worst-case connector vibration can be identified 1230, such as within a computer network. In one or more embodiments, the control system or logic can dynamically implement test routing based on a health assessment 1232. For instance, the control system can step through a connector wear evaluation to determine severity of wear and necessity of a service action, where there may be tiers of risk, such as preventative, low-risk, and/or high-risk.

Those skilled in the art will note that a non-destructive method of multi-directional motion monitoring of plugged electrical connectors is provided herein. By measuring and recording motion and comparing the measured motion to calibrated wear data, the control system can dynamically track and provide timely recommendations, for instance, with respect to one or more service actions to be taken on a particular electrical connector of an electronic system or network. In one or more embodiments, in situ connector pin motion detection is provided by providing one or more appropriately configured guide pins and associated cavities with a sensor assembly such as described herein to provide data and to provide the data to a control system configured to monitor the sensor data. An accurate set of pressure sensors (such as piezoelectric, piezo-resistive, magneto-resistive, capacitive) can be used to measure the motion and/or rotation of the guide pins within their respective cavities, and thus, of the plug connectors with respect to the connector receptacles, along the x axis, y axis, and z axis, with motion being measured as a function of external pressure applied to the pressure sensors by the guide pins. Each monitoring subassembly can provide separate measurements, with the sensors being shielded from wear and electrically isolated from the guide pin(s). A variety of guide pin configurations can be used, such as a pyramid or cone-shape. Further, different guide pin configurations can be combined in a single application, if desired.

In one or more implementations, a structure and method are disclosed herein for monitoring multi-directional connector motion utilizing guide pins and pressure sensors integrated with the electrical connectors. In one embodiment, the structure includes an electrical connector with at least one tapered guide pin protruding from at least one surface of the electrical connector, where a receptacle accepts the electrical connector, and the at least one tapered guide pin. One or more cavities are present between the at least one tapered guide pin and the receptacle. The receptacle includes a set of pressure sensors for monitoring multi-axis motion, such as three-dimensional motion, of the electrical connector. The set of pressure sensors include, in one or more embodiments, a plurality of piezoelectric strips disposed on a plurality of surfaces within or near the cavity and surrounding the at least one tapered guide pin.

Further exemplary embodiments of a computing environment to implement one or more aspects of the present invention are described below with reference to FIGS. 13-15.

By way of further example, FIG. 13 depicts one embodiment of a computing environment 1300, which includes a computing system 1312. Examples of well-known computing systems, environments, and/or configurations that may be suitable for use with computer system 1312 include, but are not limited to, a server, a desktop computer, a work station, a wireless computer, a handheld or laptop computer or device, a mobile phone, a programmable consumer electronic device, a tablet, a personal digital assistant (PDA), and the like.

Computing system 1312 can be described in the general context of computer system-executable instructions, such as program modules, being executed by a computer system. Generally, program modules include routines, programs, objects, components, logic, data structures, and so on that perform particular tasks or implement particular abstract data types.

As depicted in FIG. 13, computing system 1312, is shown in the form of a general-purpose computing device. The components of computing system 1312 can include, but are not limited to, one or more processors or processing units 1316, a system memory 1323, and a bus 1318 that couples various system components including system memory 1323 to processor 1316.

In one embodiment, processor 1316 can be based on the z/Architecture® offered by International Business Machines Corporation, or other architectures offered by International Business Machines Corporation or other companies.

Bus 1318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing system 1312 can include a variety of computer system readable media. Such media may be any available media that is accessible by computing system 1312, and it includes both volatile and non-volatile media, removable and non-removable media.

System memory 1323 can include computer system readable media in the form of volatile memory, such as random access memory (RAM) 1330 and/or cache memory 1332. Computing system 1312 can further include other removable/non-removable, volatile/non-volatile computer system storage media. By way of example only, storage system 1334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to bus 1318 by one or more data media interfaces. As described below, memory 1323 can include at least one program product having a set (e.g., at least one) of program modules or code that are configured to carry out the functions of embodiments of the invention.

Program/utility 1340, having a set (at least one) of program modules 1342, can be stored in memory 1332 by way of example, and not limitation, as well as an operating system, one or more application programs, other program modules, and program data. Each of the operating system, one or more application programs, other program modules, and program data or some combination thereof, can include an implementation of a networking environment. Program modules 1342 generally carry out the functions and/or methodologies of embodiments of the invention as described herein. Alternatively, a control system processing module, logic, etc., 1301 can be provided within computing environment 1312.

Computing system 1312 can also communicate with one or more external devices 1314 such as a keyboard, a pointing device, a display 1324, etc.; one or more devices that enable a user to interact with computing system 1312; and/or any devices (e.g., network card, modem, etc.) that enable computing system 1312 to communicate with one or more other computing devices. Such communication can occur via Input/Output (I/O) interfaces 1322. Still yet, computing system 1312 can communicate with one or more networks such as a local area network (LAN), a general wide area network (WAN), and/or a public network (e.g., the Internet) via network adapter 1320. As depicted, network adapter 1320 communicates with the other components of computing system, 1312, via bus 1318. It should be understood that although not shown, other hardware and/or software components could be used in conjunction with computing system 1312. Examples, include, but are not limited to: microcode, device drivers, redundant processing units, external disk drive arrays, RAID systems, tape drives, and data archival storage systems, etc.

One or more aspects may relate to or use cloud computing.

It is understood in advance that although this disclosure includes a detailed description on cloud computing, implementation of certain teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

A cloud computing node can include a computer system/server, such as the one depicted in FIG. 13. Computer system/server 1312 of FIG. 13 can be practiced in distributed cloud computing environments where tasks are performed by remote processing devices that are linked through a communications network. In a distributed cloud computing environment, program modules may be located in both local and remote computer system storage media including memory storage devices. Computer system/server 1312 is capable of being implemented and/or performing any of the functionality set forth hereinabove.

Figure 14:
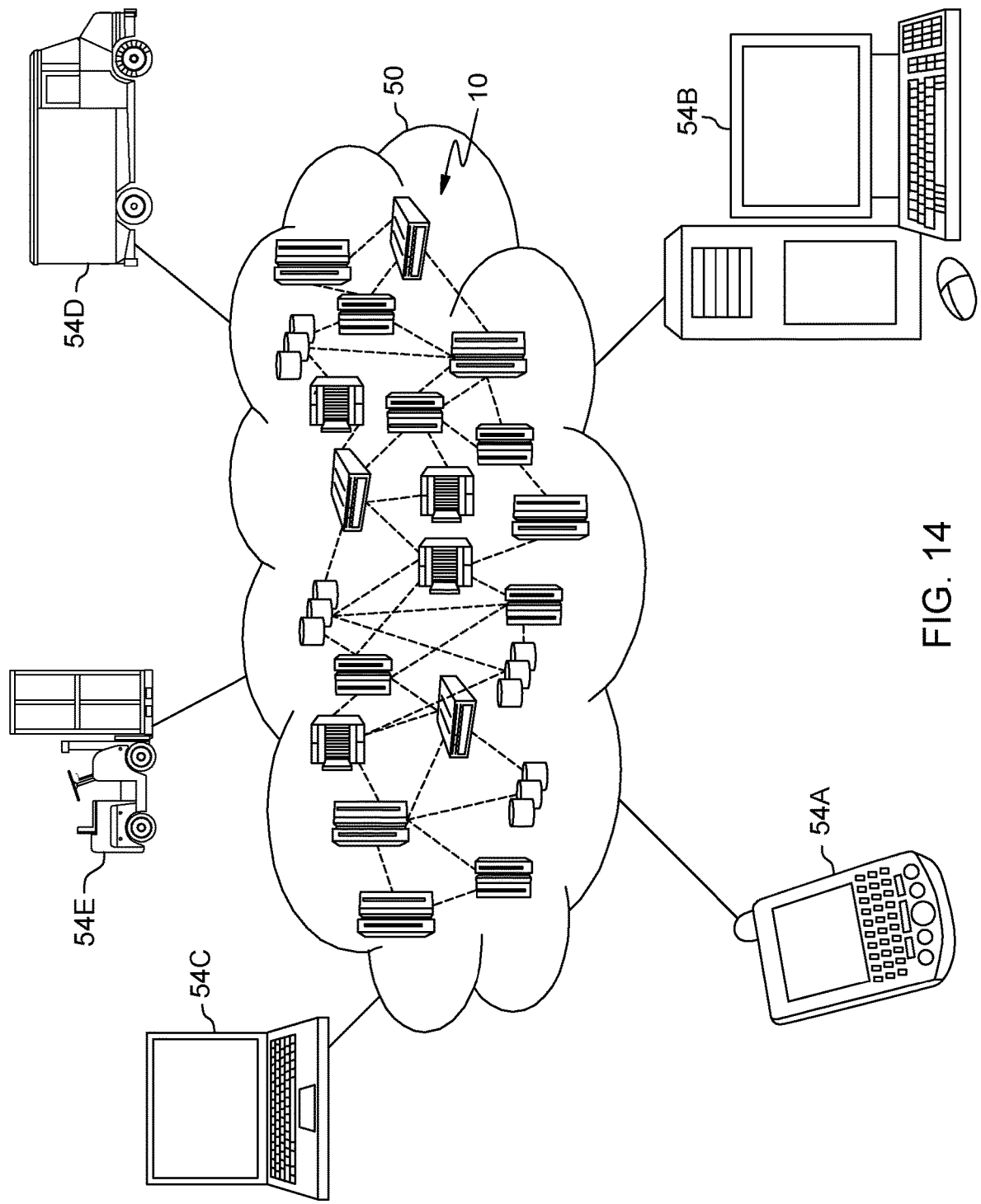
FIG. 14 depicts one embodiment of a cloud computing environment which can facilitate implementing, or be used in association with, one or more aspects of the present invention.

Referring now to FIG. 14, illustrative cloud computing environment 50 is depicted. As shown, cloud computing environment 50 can comprise one or more cloud computing nodes 10 with which local computing devices used by cloud consumers, such as, for example, personal digital assistant (PDA) or cellular telephone 54A, desktop computer 54B, laptop computer 54C, a transport vehicle 54D, and/or another vehicle, such as a fork-lift 54E, may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 14 are intended to be illustrative only and that computing nodes 10 and cloud computing environment 50 can communicate with any type of computerized device over any type of network and/or network addressable connection (e.g., using a web browser).

Figure 15:
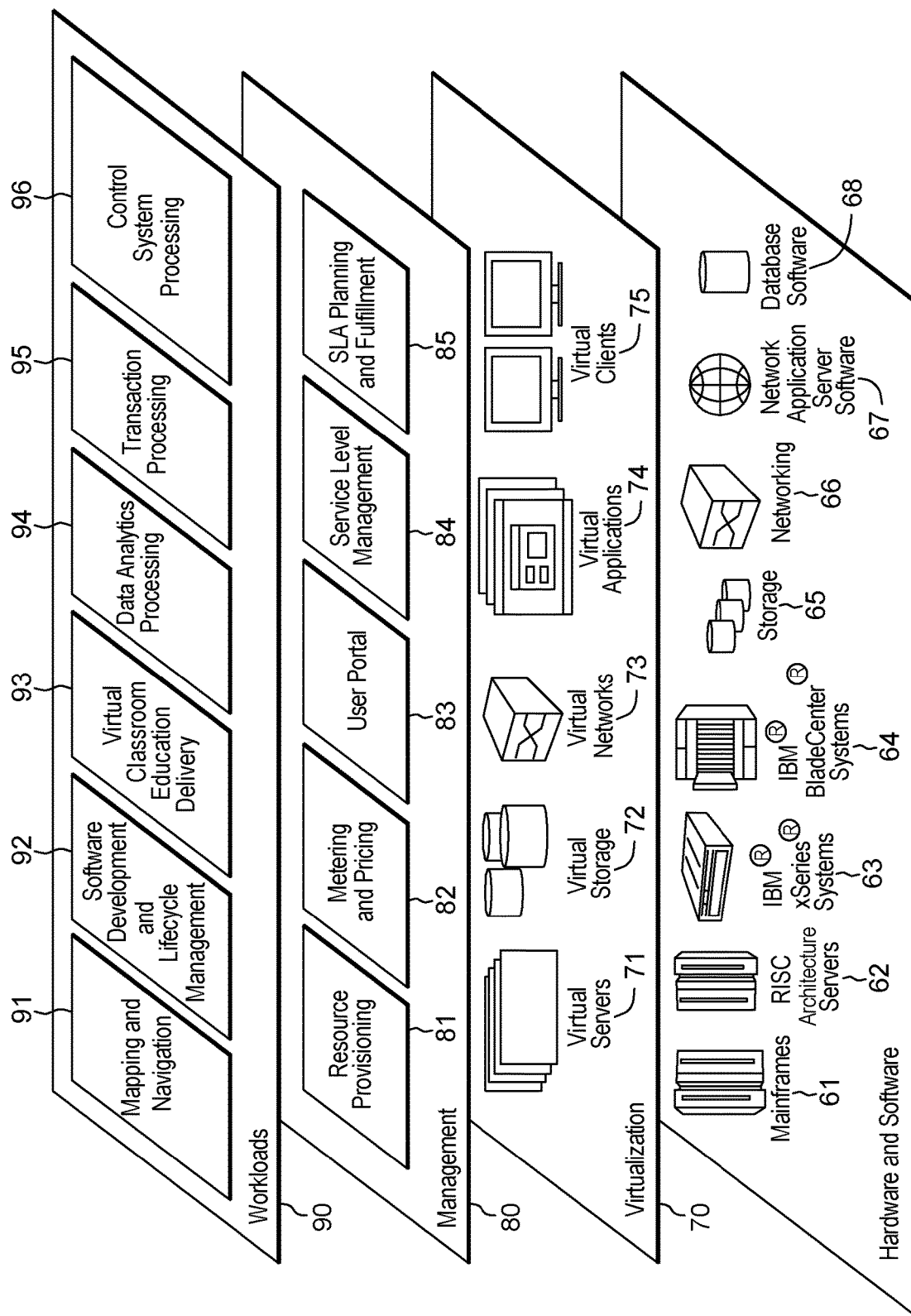
FIG. 15 depicts an example of abstraction model layers, which can facilitate implementing control system processing, in accordance with one or more aspects of the present invention.

Referring to FIG. 15, a set of functional abstraction layers provided by cloud computing environment 50 (FIG. 14) is shown. It should be understood in advance that the components, layers, and functions shown in FIG. 15 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and control system processing 96.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. An apparatus comprising:
   a connector receptacle including one or more receptacle electrodes;
   a plug connector configured to couple to the connector receptacle, the plug connector including one or more plug electrodes, and the plug connector plugging to the connector receptacle with the plug electrode(s) in contact with the receptacle electrode(s) to form an electrical connection;
   a sensor assembly configured to sense in multiple directions motion of the plug connector relative to the connector receptacle when the plug connector is operatively plugged to the connector receptacle, and to generate sensor data based on sensed motion of the plug connector relative to the connector receptacle; and
   a control system to monitor, based on the sensor data, motion of the plug connector relative to the connector receptacle to facilitate identifying potential wear of one or more electrodes of the plug electrode(s) and receptacle electrode(s) due to the motion.

2. The apparatus of claim 1, wherein the control system is configured to determine, based at least in part on the sensor data, whether the sensed motion exceeds a calibrated threshold profile indicative of likely wear degradation of the one or more electrodes due to the motion.

3. The apparatus of claim 2, wherein the control system is further configured to provide an indication when the sensed motion exceeds the calibrated threshold profile indicative of the likely wear degradation of the one or more electrodes.

4. The apparatus of claim 1, further comprising:
   an element extending from one of the plug connector and the connector receptacle into a cavity in the other of the plug connector and connector receptacle when the plug connector is operatively plugged to the connector receptacle; and
   wherein the sensor assembly further comprises at least one pressure sensor positioned to monitor motion of the element within the cavity in multiple directions and to generate the sensor data based on sensed motion of the element within the cavity.

5. The apparatus of claim 4, wherein a pressure sensor of the at least one pressure sensor is associated with the cavity to generate the sensor data based on sensed motion of the element within the cavity when the plug connector is operatively plugged to the connector receptacle.

6. The apparatus of claim 5, wherein the element comprises a guide pin, and the cavity is configured to receive the guide pin when the plug connector is operatively plugged to the connector receptacle.

7. The apparatus of claim 6, wherein the guide pin is a tapered guide pin.

8. The apparatus of claim 4, wherein a pressure sensor of the at least one pressure sensor is coupled to the element to generate the sensor data based on sensed motion of the element within the cavity when the plug connector is operatively plugged to the connector receptacle.

9. The apparatus of claim 8, wherein the element comprises a guide pin, and the cavity is configured to receive the guide pin when the plug connector is operatively plugged to the connector receptacle.

10. The apparatus of claim 9, wherein the guide pin is a tapered guide pin.

11. The apparatus of claim 1, wherein the sensor assembly comprises multiple pressure sensor subassemblies, each pressure sensor subassembly being configured to monitor a respective directional motion of the plug connector relative to the connector receptacle.

12. The apparatus of claim 1, wherein the sensor assembly is configured to monitor motion of the plug connector relative to the connector receptacle in three dimensions.

13. The apparatus of claim 1, wherein the control system is configured to save sensor data generated over time to record a history of motion of the plug connector relative to the connector receptacle when the plug connector is operatively plugged to the connector receptacle.

14. An apparatus comprising:
   a connector receptacle including one or more receptacle electrodes;
   a plug connector configured to couple to the connector receptacle, the plug connector including one or more plug electrodes, and the plug connector plugging to the connector receptacle with the plug electrode(s) in contact with the receptacle electrode(s) to form an electrical connection;
   a sensor assembly configured to sense motion of the plug connector relative to the connector receptacle in three dimensions when the plug connector is operatively plugged to the connector receptacle, and to generate sensor data based on sensed motion of the plug connector relative to the connector receptacle; and
   a control system configured to monitor, based on the sensor data, motion of the plug connector relative to the connector receptacle to facilitate identifying potential wear of one or more electrodes of the plug electrode(s)

and receptacle electrode(s) due to sensed motion by determining, at least in part, whether the sensed motion exceeds a calibrated threshold profile indicative of likely wear degradation of the one or more electrodes due to the motion.

15. The apparatus of claim 14, wherein the control system is further configured to provide an indication when the sensed motion exceeds the calibrated threshold profile indicative of the likely wear degradation of the one or more electrodes.

16. The apparatus of claim 14, further comprising:
an element extending from one of the plug connector and the connector receptacle into a cavity in the other of the plug connector and connector receptacle when the plug connector is operatively plugged to the connector receptacle; and
wherein the sensor assembly further comprises at least one pressure sensor positioned to monitor motion of the element within the cavity in multiple directions and to generate the sensor data based on sensed motion of the element within the cavity.

17. The apparatus of claim 16, wherein a pressure sensor of the at least one pressure sensor is associated with the cavity to generate the sensor data based on sensed motion of the element within the cavity when the plug connector is operatively plugged to the connector receptacle, and wherein the element comprises a tapered guide pin, and the cavity is configured to receive the tapered guide pin when the plug connector is operatively plugged to the connector receptacle.

18. The apparatus of claim 14, wherein the sensor assembly is configured to monitor motion of the plug connector relative to the connector receptacle in three dimensions.

19. The apparatus of claim 14, wherein the control system is configured to save sensor data generated over time to record a history of motion of the plug connector relative to the connector receptacle when the plug connector is operatively plugged to the connector receptacle.

20. A method comprising:
providing a sensor assembly for an electrical connection to be established between a connector receptacle and a plug connector, the connector receptacle including one or more receptacle electrodes, and the plug connector being configured to couple to the connector receptacle, and including one or more plug electrodes, the plug connector operatively plugging to the connector receptacle with the plug electrode(s) in contact with the receptacle electrode(s) to form the electrical connection, and the sensor assembly being configured to sense motion of the plug connector relative to the connector receptacle when the plug connector is operatively plugged to the connector receptacle, and to generate sensor data based on sensed motion of the plug connector relative to the connector receptacle; and
providing a control system configured to monitor, based on the sensor data, motion of the plug connector relative to the connector receptacle to facilitate identifying potential wear of one or more electrodes of the plug electrode(s) and receptacle electrode(s) due to the motion.

* * * * *